United States Patent
Lo et al.

(10) Patent No.: US 8,621,520 B2
(45) Date of Patent: Dec. 31, 2013

(54) DELIVERY OF SELECTIVE CONTENT TO CLIENT APPLICATIONS BY MOBILE BROADCAST DEVICE WITH CONTENT FILTERING CAPABILITY

(75) Inventors: Charles N. Lo, San Diego, CA (US); Donald W. Gillies, San Diego, CA (US); Mark G. Staskauskas, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 347 days.

(21) Appl. No.: 12/768,506

(22) Filed: Apr. 27, 2010

(65) Prior Publication Data
US 2010/0299702 A1 Nov. 25, 2010

Related U.S. Application Data

(60) Provisional application No. 61/179,634, filed on May 19, 2009.

(51) Int. Cl.
*H04N 5/445* (2011.01)
(52) U.S. Cl.
USPC ............. 725/50; 725/36; 725/39; 455/466
(58) Field of Classification Search
USPC ............ 725/37–61, 131–134, 139–142, 725/151–153; 709/217–232; 455/3.01–3.06, 466
See application file for complete search history.

(56) References Cited

U.S. PATENT DOCUMENTS

| | | | | |
|---|---|---|---|---|
| 5,796,952 A | * | 8/1998 | Davis et al. | 709/224 |
| 7,437,772 B1 | * | 10/2008 | Thenthiruperai et al. | 726/30 |
| 7,706,740 B2 | * | 4/2010 | Collins et al. | 455/3.01 |
| 7,729,709 B1 | * | 6/2010 | Loeb et al. | 455/456.3 |

(Continued)

FOREIGN PATENT DOCUMENTS

| | | |
|---|---|---|
| EP | 1856350 A1 | 12/2007 |
| JP | 2000059756 A | 2/2000 |

(Continued)

OTHER PUBLICATIONS

International Search Report and Written Opinion—PCT/US2010/035463, International Search Authority—European Patent Office—Mar. 2, 2011 (092280).

(Continued)

*Primary Examiner* — Annan Shang
(74) *Attorney, Agent, or Firm* — The Marbury Law Group, PLLC

(57) ABSTRACT

Methods and systems enable application content for use by an application running on a receiver device to be broadcast by a mobile multimedia broadcast network for energy-efficient reception and use by receiver devices. Information about application content that will be broadcast is broadcast in application metadata messages. Receiver devices may receive such application metadata messages in a broadcast receiver client which passes the information to the application. The application may inform the broadcast receiver client of particular application content or filtering attributes to use in selecting application content to be received. The broadcast receiver client receives the indicated application content at the designated broadcast time and passes the received content to the application for processing. In an embodiment the application is a Mobile Billboard Advertising (MobAd) application, the application metadata includes attributes about ad content and the broadcast application content includes ad content.

90 Claims, 16 Drawing Sheets

(56) References Cited

U.S. PATENT DOCUMENTS

| | | | |
|---|---|---|---|
| 7,735,104 B2 | 6/2010 | Dow et al. | |
| 7,836,192 B2 * | 11/2010 | Johnson et al. | 709/229 |
| 7,941,564 B2 * | 5/2011 | Gebhardt et al. | 709/248 |
| 8,046,839 B2 * | 10/2011 | Lo | 726/26 |
| 8,219,134 B2 * | 7/2012 | Maharajh et al. | 455/519 |
| 2003/0154128 A1 | 8/2003 | Liga et al. | |
| 2006/0259642 A1 * | 11/2006 | Du et al. | 709/247 |
| 2007/0274526 A1 * | 11/2007 | Wang et al. | 380/277 |
| 2008/0155581 A1 | 6/2008 | Leary | |
| 2008/0263581 A1 | 10/2008 | Turner | |
| 2008/0271072 A1 * | 10/2008 | Rothschild et al. | 725/35 |
| 2009/0093259 A1 | 4/2009 | Edge et al. | |
| 2009/0094113 A1 | 4/2009 | Berry et al. | |
| 2009/0119710 A1 | 5/2009 | Lo et al. | |
| 2009/0260030 A1 | 10/2009 | Karlsson et al. | |
| 2010/0151882 A1 * | 6/2010 | Gillies et al. | 455/456.1 |

FOREIGN PATENT DOCUMENTS

| | | |
|---|---|---|
| JP | 2001298375 A | 10/2001 |
| JP | 2002185945 A | 6/2002 |
| JP | 2002528971 A | 9/2002 |
| JP | 2002530943 A | 9/2002 |
| JP | 2006508619 A | 3/2006 |
| JP | 2008065414 A | 3/2008 |
| JP | 2008065415 A | 3/2008 |
| KR | 20070118554 A | 12/2007 |

OTHER PUBLICATIONS

Open Mobile Alliance: "MobAd presentation for BCAST", Feb. 19, 2008, pp. 1-6, XP002605618, Retrieved from the Internet: URL:http://member.openmobilealliance.org/ftp/Public_documents/REQ/REQ-MOBAD/2008/OMA-REQ-MobAd-2008-0028-INP_informational_presentation_to BCAST.zip [retrieved on Oct. 18, 2010] p. 2-p. 5.

Open Mobile Alliance: "Mobile Advertising Requirements", Aug. 5, 2008, XP002605620, Retrieved from the Internet: URL:http://member.openmobilealliance.org/ftp/Public_documents/REO/REO-MOBAD/Permanent_documents/OMA-RD-Mobile_Advertising-V1_0-20080805-C. zip [retrieved on Oct. 18, 2010] section 5.7 section 5.8.

Open Mobile Alliance: "Mobile Broadcast Services Requirements", Feb. 26, 2009, XP002605619, Retrieved from the Internet: URL:http://member.openmobilealliance.org/ftp/Public_documents/bcast/Permanent_docume nts/OMA-RD-BCAST-V1_1-20090226-D.zip [retrieved on Oct. 18, 2010] section 5.8 section 5.11 section 5.15.

Open Mobile Alliance: Service Guide for Mobile Broadcast Services, OMA-TS-BCAST_Service_Guide-V1_0-20090212-A Feb. 12, 2009, pp. 1-232, XP002616290, Retrieved from the Internet : URL : http://member.openmobilealliance.org/ftp/Publicdocuments/bcast/Permanent_documents/OMA-T-BCAST_Service_Guide-V1_0-200902 12-A.zip [retrieved on Jan. 11, 2011] p. 17 p. 19-p. 20 pp. 22-23, "ServiceType".

* cited by examiner

DELIVERY OF SELECTIVE CONTENT TO CLIENT APPLICATIONS BY MOBILE BROADCAST DEVICE WITH CONTENT FILTERING CAPABILITY

RELATED APPLICATIONS

This application claims the benefit of priority to U.S. Provisional Application No. 61/179,634 entitled "Delivery of Selective Content to Client Applications by Mobile Broadcast Device with Content Filtering Capability" filed May 19, 2009, the entire contents of which are hereby incorporated by reference.

BACKGROUND

Wireless communication technologies have seen explosive growth over the past few years. This growth has been fueled by wireless services providing freedom of movement to the mobile public, and cutting the tether to hardwired communication systems. In addition, the increasing quality and speed of voice and data communications over the wireless medium has attracted additional users. As a result of these service enhancements, the popularity of wireless services is expected to continue to grow rapidly.

A recent addition to wireless communication technologies has been the ability to broadcast programs to mobile users. Mobile broadcast users can view mobile editions of news, entertainment, sports, business, and other programming using their cell phone or other wireless devices. These broadcast systems have seen significant increase in usage and availability worldwide. As a result, it is anticipated that additional services will become available and there will be increased demand for services and applications utilizing mobile broadcast television services.

SUMMARY

The various embodiments provide energy-efficient methods and systems for delivering content for applications running on receiver devices other than broadcast applications (i.e., "higher-layer applications"). An example of an application that may benefit from the embodiments is the targeted delivery of advertisement content, complying with the Open Mobile Alliance (OMA) Mobile Advertising (MobAd) standard, to device-resident advertisement applications via the OMA-BCAST mobile broadcast service. The methods, systems and specification modifications of the various embodiments enable a device-side application client (which may pertain to mobile advertising such as the MobAd Ad Engine), to rely on metadata/rule-based selective downloading capability of a broadcast client (such as the 'BCAST Terminal' as specified in the OMA BCAST standard, and referred to in this document as the 'BCAST Client') functioning within the receiver device to support the filtering of application content (such as ad content for MobAd's Ad Engine) suitable for the end user. As an example of the above, a MobAd Ad Engine may rely on the BCAST Client to selectively download ad content, sent as broadcast files, and provide those ads to the Ad Engine. In turn, the Ad Engine delivers appropriate ad content to an end-user application such as an ad-enabled mobile game, or a browser, for subsequent rendering to the user. In the case of mobile advertising, the application client, also referred to here as the "ad client", may be informed by the broadcast client (a) that the ad content service is available (i.e., offered by the broadcast service provider), (b) of the filtering criteria available to the broadcast client, and (c) of the contextualization and personalization capabilities of the broadcast client. If the content filtering capabilities indicated by the broadcast client are sufficient, the ad client may request the broadcast client to selectively receive and/or filter and forward the received ad contents to the application. In doing so, the higher-layer application may provide a direct filtering decision to the broadcast layer on whether to receive the content when it arrives.

In another embodiment, if the filtering capability of the broadcast client is inadequate, the ad client may request that the broadcast client download all the application content broadcasts in that service so that the ad client can perform the subsequent filtering (e.g., according to user reference/context/location).

In another embodiment, the ad client may contain resident filtering data which it provides to the broadcast client such that selective reception, based on those provided filtering data, may override similar filtering metadata the broadcast client has available. In yet another embodiment, the filtering data that the ad client provides to the broadcast client may represent new rules for controlling selective reception, The embodiments also provide a mechanism for flexible and controlled usage of metadata and filtering rules that are provided by the content or broadcast service provider and made available to the broadcast client for use in content filtering. An example application is mobile advertising, which may be implemented according to the OMA MobAd standard, and an example implementation of the embodiments enables the use of OMA BCAST broadcasts to deliver MobAd ad content to mobile receiver devices.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
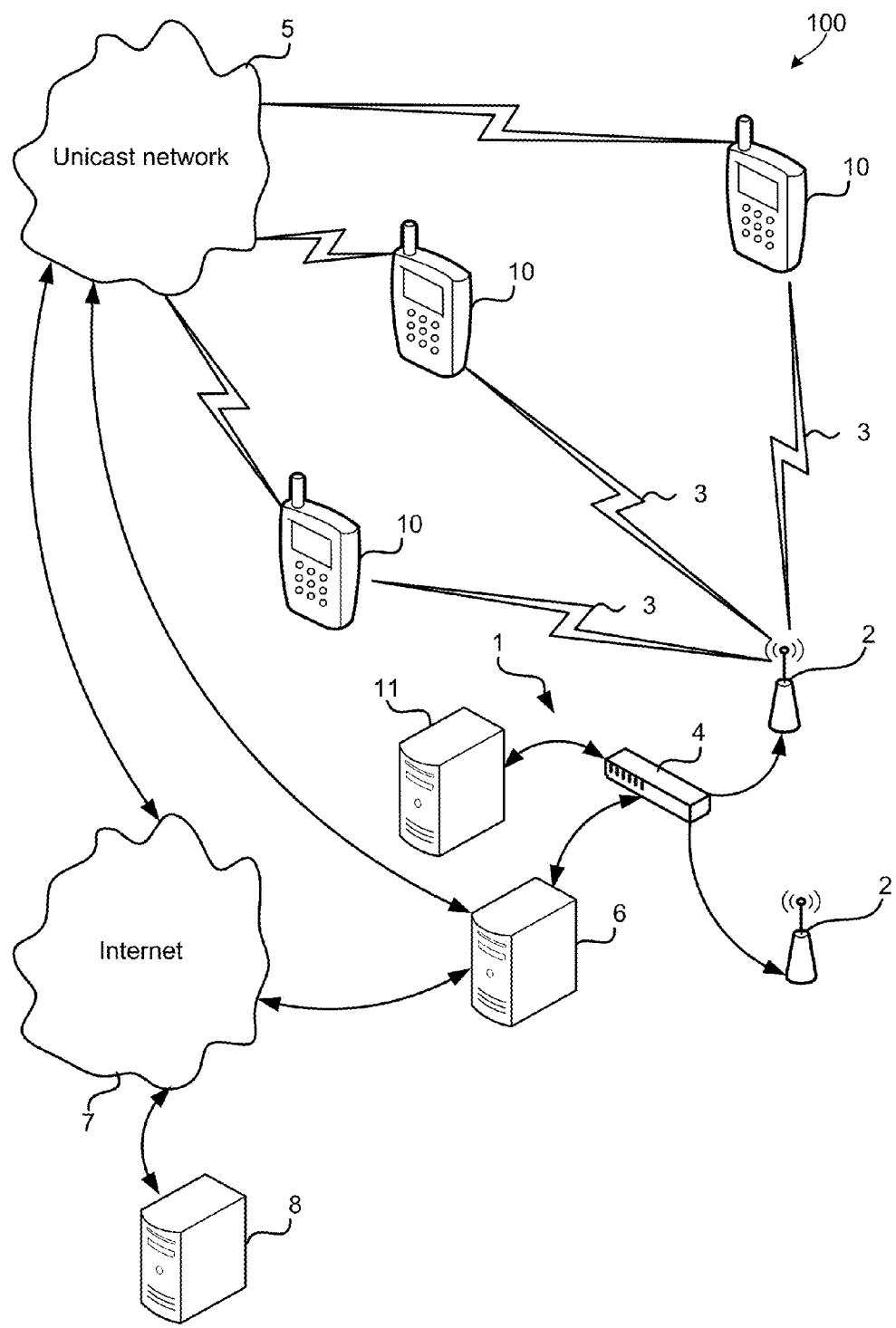
FIG. 1 is a communication system block diagram illustrating a mobile TV broadcast communication system suitable for use in an embodiment.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the terms "mobile device", "mobile receiver device", and "receiver device" refer to any one or all of cellular telephones, personal data assistants (PDA's), palm-top computers, lap-top computers, wireless electronic mail receivers (e.g., the Blackberry® and Treo® devices), multimedia Internet enabled cellular telephones (e.g., the Blackberry Storm®), Global Positioning System (GPS) receivers, wireless gaming controllers, and similar personal electronic devices which include a programmable processor and memory and mobile TV broadcast receiver circuitry for receiving and processing mobile TV broadcast transmissions.

The word "broadcast network" is used herein to mean a network for the transmission of data (information packets) so that it can be received from the same signal by a large number of receiving devices simultaneously. Examples of broadcast networks include traditional pager networks, mobile television service broadcast signals, including content broadcasts (content flow) and overhead information broadcasts (overhead flow) such as metadata messages. The term "unicast network" is used herein to refer to communication networks which transmit data to a single destination. Examples of a unicast network include WiFi and cellular data communication networks, although a WiFi network can also function as a broadcast network. Examples of unicast messages include two-way data communications associated with Internet access via a cellular data network, multimedia message service (MMS), and electronic mail messages as may be carried via a cellular telephone data communication network.

The term "content providers" is used herein to refer to companies which provide video, audio, text, graphics, multimedia, website and other data that is broadcast over a mobile television system. The term "mobile TV broadcast service providers" is used herein to refer to those entities which broadcast mobile television signals. Typically, mobile TV broadcast service providers receive broadcast content from the content providers and relay it to users over a broadcast network.

The growing popularity of mobile television (TV) has provided new sources of revenue for content providers and mobile TV broadcast service providers who can use the new medium to reach additional consumers.

A number of different mobile TV layer technologies and related standards are available or contemplated in the future, all of which may implement and benefit from the various embodiments. Such standards include Open Mobile Alliance Mobile Broadcast Services Enabler Suite (OMA BCAST), MediaFLO®, Digital Video Broadcast IP Datacasting (DVB-IPDC), and China Multimedia Mobile Broadcasting (CMMB). While the broadcast formats and terminology vary among the different mobile TV service standards, they all employ metadata transmissions to enable mobile devices to receive selected content and inform users of programs and content available for viewing or download. To avoid confusion regarding particular broadcast standards, the generic terms content flow, information or overhead flow, and metadata messages are used herein to describe the various embodiments.

Mobile broadcast enables transmission of a variety of content services to a large population of devices and is much more efficient in radio resource utilization than unicasting (e.g., typical cellular telephone data communication links). The mobile broadcast receiver device (which is sometimes referred to as a mobile broadcast terminal or receiver device) is generally aware of the broadcast schedule of content files, and may also have possession of metadata that characterizes, and/or rules that govern the reception of, that content. Furthermore, the mobile receiver device may have access to personalization or contextualization information about the user. It may also have dynamic knowledge of its own location (both present location, and past location(s)). Together, possession of this information enables the receiver device to make a priori decisions about the suitability of each content item (i.e., file) for the user. The desired subset of content items among the entirety can be determined from content attributes, sent prior to broadcast transmission of the actual content items themselves. As a result, the mobile receiver device's RF receiver need not be powered on for the entire duration of the file broadcast session. It only has to "wake up" to receive the broadcast file(s) of interest. Since contents are selectively downloaded, as opposed to downloading the contents in their entirety and filtering them later, a potentially significant battery power savings may be achieved.

In a mobile broadcast service layer standard, such as OMA BCAST, broadcast file content is explicitly tied to individual mobile broadcast services, such as linear TV, interactive TV, clipcasting, file download services, of the actual content items themselves, and mobile radio. For a file-based broadcast service such as an "Advertisement (Ad) Channel", each constituent content item of that service is an individual ad. The various embodiments enable the inclusion of metadata and filtering rules in the Service Guide (SG) and/or the broadcast notification message that notify the terminal of the future arrival of each ad, to enable the mobile receiver device to make an a priori filtering decision whether or not to download that ad when it is later broadcast.

Mobile broadcast technology can also offer its broadcast transport and selective downloading services to other client (i.e., device-side) applications, particularly higher-layer applications. Examples of other device-side higher-layer client applications include content distribution (RSS) service, advertisement service, device management (DM) firmware download service, multimedia broadcast message service, email service, etc. Broadcast distribution alone, or in conjunction with content filtering capability of mobile broadcast terminals to selectively download broadcast files, can be utilized to support applications such as targeted advertising or broadcast software updates.

A particularly useful implementation of the various embodiments involves mobile advertising, which may be based on OMA MobAd standards that enable an advertising higher-layer application ("ad application") to receive and display mobile advertisements on receiver devices. MobAd is a new OMA standard which supports targeted delivery of advertisements to mobile devices for presentation to users. MobAd-compliant services might deliver display ads over unicast or broadcast networks to mobile devices. Receiver devices may receive and cache (i.e., store in local memory) the ads for subsequent delivery to a requesting application that displays the ads to the user. Examples of ad-requesting applications include a web browser for web-formatted ads, or a game for ads integrated within a game context (e.g., banners, boarders, or billboards appearing within an action game). The text, images and formatting data for mobile advertisements, which are generally referred to herein as "advertisement content" or "ad content," may be delivered to an ad application operating in the mobile devices through a variety of mechanisms. In MobAd, ad content is nominally delivered via a "pull" mechanism over the cellular unicast channel. For users that have opted to receive display ads as part of an end-user application (e.g., a game or browser), the "pull" mechanism involves an end-user application (called 'Ad App') requests ads from another device-side entity known as the "Ad Engine." In turn, the Ad Engine accesses a network-based server (referred to in the MobAd specification as the 'Ad Server') via the cellular network to request unicast delivery of ad content from that server. MobAd also defines the ability to deliver advertisements via broadcast mechanisms to users, such as when there are a large number of users.

The various embodiments leverage the built-in content filtering capabilities of OMA BCAST to enable a new power-efficient delivery mechanism for higher-layer application content to receiver devices. As an example use of this capability, a particular embodiment makes use of the broadcast delivery of advertisements specified in MobAd, which leverage the built-in content filtering capabilities of OMA BCAST, to enable a new power-efficient delivery mechanism for ad content to an ad application operating on receiver devices. By implementing the methods, systems and specification modifications described in the various embodiments, the MobAd device-side client function may rely on a metadata/rule-based selective downloading capability of the BCAST Client (formally referred to in the OMA BCAST standards as the 'BCAST Terminal') functioning within the receiver device to support the filtering of ads suitable for the end user. The MobAd client function, or 'MobAd Client' for short, corresponds to the 'Ad Engine' defined in the OMA MobAd standard. The terms 'MobAd Client' and 'Ad Engine' will be used interchangeably herein depending on the context. The MobAd Client may be informed by the BCAST Client (a) that one or more ad service(s) is available (offered by the broadcast service provider), (b) of the filtering criteria available to the BCAST Client, and (c) of the contextualization and personalization capabilities of the BCAST Client. Assuming that the ad filtering capabilities indicated by the BCAST Client are sufficient, the MobAd Client may request the BCAST Client to filter (via selective download) and forward the received ad contents to the MobAd Client. Alternately, in the same embodiment, the MobAd client may request the broadcast client to disable the broadcast client filtering step, and present Ad metadata for each Ad to the MobAd client, allowing the MobAd client to make a "just in time" filtering decision, and either schedule later content download, or to cause the broadcast client to sleep at the content download time. In a different embodiment, should the filtering capability of the BCAST Client be deemed inadequate, the MobAd Client may request that the BCAST Client download all the ads broadcast in that service, so that the MobAd Client can perform the subsequent filtering (e.g. according to user reference/context/location).

The alternative to downloading all broadcast ad content and performing filtering in the MobAd Client should not negatively impact the nominal behavior of the broadcast application (e.g., linear TV player/viewer). For example, consider the OMA BCAST standard, in which a number of "service types" are defined, and each service is identified as corresponding natively to a BCAST, MobAd, or other service type. The 'Auxiliary Data' service type, corresponding to an ad service, can be identified as to whether it is to be used in conjunction with a broadcast application (e.g. linear TV), or a mobile advertisement application (e.g. mobile game with targeted advertising). In the former, targeted ads are selectively downloaded/cached and subsequently inserted for display at pre-defined times. In the latter, although ad contents are similarly selectively downloaded and cached in the device, subsequent display of ad contents is not pre-defined, but is controlled by the underlying end-user application. Therefore, it is unambiguous whether an Auxiliary Data service is to be associated with the broadcast application or the advertisement application. In other words, the MobAd Client can utilize the BCAST Client to filter/receive broadcast ads on its behalf without jeopardizing the behavior of the broadcast application(s) natively supported by the BCAST Client. In filtering/receiving broadcast ads, the BCAST Client may choose one or more of the broadcast ad content for reception and download, with the selectively downloaded ad content (i.e. targeted Ads) cached in memory, for display at a pre-defined time instant by a resident ad application. In an embodiment, by providing a direct filtering decision, a higher-layer application can implement any filtering algorithm it wants, and return a "yes, no, continue-filtering-at-broadcast-layer" decision to the broadcast layer on whether to receive the content when it finally arrives.

The various embodiments offer a solution to the above problem of tight coupling between content filtering and selective downloading by the broadcast client and an application client of the broadcast client. The various embodiments also devise a mechanism for flexible and controlled usage of metadata and filtering rules provided by the content or broadcast service provider and made available to the broadcast client, to be applied to content filtering. Additionally, the embodiments describe the required interaction between the broadcast client and its application client so that the latter can be properly informed in deciding whether and how to leverage the broadcast device's native capabilities to deliver the appropriate content. An example application client is the 'Ad Engine' as defined in OMA MobAd, and which is also referred to in this document as the MobAd Client. An example broadcast client is the 'BCAST Client', formally referred to as the 'BCAST Terminal' in OMA BCAST. An example instantiation of the various embodiments involves the use of broadcast transmissions and selective reception of ad contents by the BCAST Client on behalf of the MobAd Client.

The various embodiments may be implemented in any of the variety of mobile broadcast formats and technologies, but have a particular applicability to OMA BCAST. For ease of description, the various embodiments at the device side are described herein with reference to the BCAST Client; however, such references to BCAST are not intended to necessarily limit the scope of the claims to BCAST applications, except as specifically recited in the claims themselves.

The various embodiments may be implemented with any of a variety of end-user applications that may operate on a receiver device and receive content via broadcast transmissions received by a broadcast client also operating on the receiver device. In sum, the embodiments provide a generalized interface for delivering content to those applications on mobile receiver devices. As mentioned above, a particular example of an end-user application for which the broadcast of content is well-suited is an advertisement-enabled mobile game whose ad contents are provided by a mobile advertisement application client resident on the receiver device. OMA MobAd serves as a good example because it has a great deal of filtering needs to support targeted advertising delivery. OMA MobAd along with BCAST serves as a good example of the benefits provided by using standards-based mobile broadcast and advertising technologies to deliver application content that is received by a broadcast client and provided to a device-resident ad application. They also illustrate the various interactions between the BCAST Client, as a specific instance of the broadcast client, and the Ad Engine, as a specific instance of the application client. The various embodiments are described with reference to OMA BCAST and MobAd defined mechanisms. However, such references to BCAST and MobAd are not intended to necessarily limit the scope of the claims on targeted content reception supported by broadcast delivery to advertisements in the MobAd context except as specifically recited in the claims themselves.

Mobile TV broadcast services enable mobile receiver devices to be self-contained by broadcasting information about the programs and content that will be broadcast in the future via a portion of broadcast transmissions dedicated to carrying overhead information (referred to herein as the "overhead flow," the "content description flow" or as the "metadata flow"), which is separate from the portion of the broadcast transmissions that carry the content (referred to herein as "content flow"). Mobile devices can also process this metadata to provide users with an electronic program guide (EPG). Such an electronic viewing guide, which is known in some mobile TV formats as a "Service Guide" (SG) or "electronic Service Guide" (ESG), is a viewable program guide similar to that available on cable and satellite television systems. For purposes of the embodiment descriptions, this electronic programming guide is referred to generally herein as the "Service Guide" ("SG" in the figures). Service Guides typically contain the broadcast schedule and access information (or flow ID) that receiver devices need to receive the broadcast content, and information about the content that can be presented to the user in a Service Guide display.

The content metadata in the Service Guide is typically transmitted in an overhead flow, that occupies a low bandwidth portion of the mobile TV broadcast signal, for carrying overhead information like the program and content metadata. In contrast to this overhead flow, programs and content are typically broadcast using high bandwidth portions of the broadcast signal, which are collectively referred to herein as the "content flow."

Example components of a typical mobile TV broadcast system 100 are illustrated in FIG. 1. A mobile TV broadcast network 1 typically includes a plurality of broadcast transmitters 2 controlled by a content broadcast system 4. The mobile TV broadcast network (e.g., a cellular-based mobile broadcast system such as 3GPP MBMS or 3GPP2 BCMCS, or a downlink-only mobile broadcast system such as FLO™ or DVB-H) 1 broadcasts content from the broadcast transmitters 2 as mobile broadcast transmissions 3 for reception by mobile devices 10. Within the content broadcast system 4 will typically be one or more content manager servers 6 which may be configured to manage the scheduling of content broadcasts, generation of electronic Service Guides and other metadata regarding the content broadcasts, and generation of metadata messages for broadcast via the overhead flow of the mobile TV broadcast network 1. Also within the content broadcast system 4 will typically be a subscription management server 11, such as a BCAST Subscription Management ("BSM"). Besides supporting the subscription and purchasing function with end users and the associated security key management, the subscription management server 11 may originate notification messages pertaining to application content deliver, such as the AuxDataTrigger download in BCAST which contains the dynamic filtering rules for selective downloading of ads as is described in more detail below.

The one or more content manager servers 6 may include connections to an external network, such as the Internet 7, through which the content manager server(s) 6 may receive content feeds from content sources, such as an advertising server 8. One or more content manager servers 6 may be configured according to the various embodiments to receive advertising content from one or more advertising servers 8, determine information about the received content such as the characteristics and broadcasting time for the advertisement, and generate metadata reflecting the advertisement. While FIG. 1 illustrates a content manager server 6 performing the functions of content management as well as generation advertising metadata messages, in alternative embodiments multiple servers may be employed to perform these functions.

To enable mobile devices to receive broadcast content, the mobile TV broadcast service provider server will generate metadata messages for transmission that inform mobile devices when each program or content will be transmitted and the broadcast address on which the transmission will be made. The metadata messages typically include Service Guide data identifying the services, schedules, content, related purchase and provisioning data, access and interactivity data using XML data fragments. The Service Guide may be as defined in the OMA-TS-BCAST_ServiceGuide-V1_0 specification from OMA. Mobile devices can use the information in the metadata messages, such as the Service Guide, to determine if any of the content has been selected by the user for stream reception or file download and, if so, determine the time to tune-in to the broadcast transmissions and the network address on which to receive the selected content. This functionality is leveraged in the various embodiments to enable the mobile devices to tune-in to receive just the advertising content which meets certain criteria (such as matching device-resident user demographic or preferences data, or the user's current location). These filtering criteria may be specified in the Service Guide, in a designated broadcast notification message, and/or separately provided by a mobile advertising client. Thus, the normal reception functionality may be leveraged to filter advertising broadcasts to just those ads selected for reception, thereby minimizing the power consumed by the mobile device for receiving MobAd content.

Figure 2A:
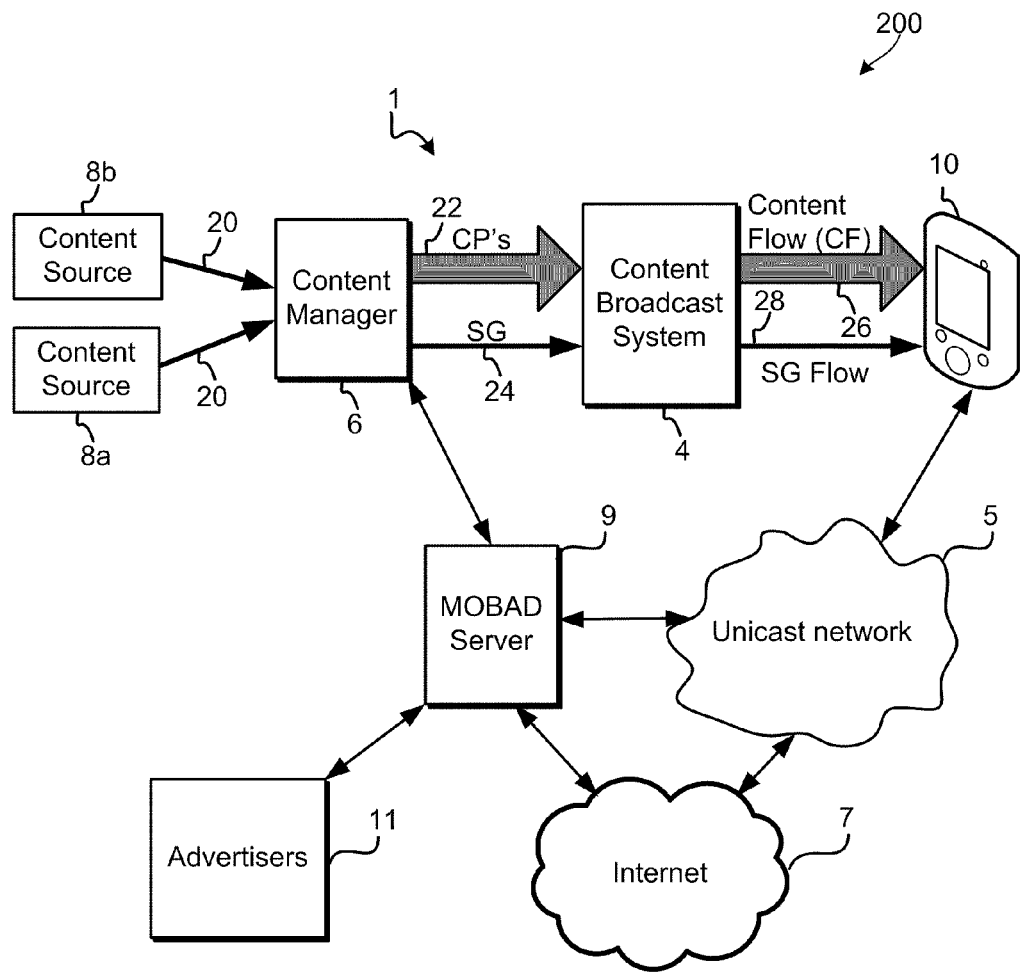
FIG. 2A is an alternative representation of a communication system block diagram of a mobile TV broadcast system which operates in conjunction with a mobile advertisement system to support ad delivery over the broadcast channel.

FIG. 2A shows an information flow diagram 200 illustrating message and metadata flows within a mobile TV broadcast network 1 according to an embodiment. As mentioned above, a mobile TV broadcast network 1 may receive content (e.g., television programs website pages, music streams, serial data feeds, electronic newspapers, etc.) from a number of content sources 8a, 8b. Such content may be provided to a content manager server 6 within a mobile TV broadcast network 1 via data networks 20 (e.g., FIG. 1, Internet 7). The content manager server 6 may either store such content in a database, or store only the metadata attributes in a database, intending to proxy and/or transcode the actual content at a later date. In either case, the content manager 6 schedules the content for broadcast. In scheduling content for broadcast, the content manager server 6 may determine what will be broadcast when, and on which multicast IP address and port, although the addressing information could also be dictated by the content broadcast system. As part of scheduling, the content manager server 6 may format the content into content packages (CPs). The content manager server 6 can also determine information about the content, such as a title of the information, its source (e.g., an Internet address, URL or producer), the nature of the information (e.g., sports, news, finance, etc.), its age or date/time of creation, and the price of obtaining viewing access to the content. The content manager server 6 may combine the scheduled broadcast time and address with the other information regarding the content to generate content packet descriptions (CPDs) in the form of a Service Guide. When content is scheduled for broadcast, the content manager server 6 may provide the content packages to the content broadcast system 4 in a network dataflow 22, along with the Service Guide data in a network dataflow 24. It is also possible for the content broadcast system 4 to generate the actual Service Guide to be broadcast. These data flows are then processed by the content broadcast system 4 into a multiplex broadcast waveform which are broadcast live by the broadcast transmitters 2 as broadcast transmissions 3.

Within the broadcast transmissions there may be several different content flows (CF) 26, which are data packets carrying the broadcast content, as well as Service Guide flows 28, which are data packets carrying the content packet descriptions, access information, subscription/pricing related data, etc. Mobile devices 10 receive the broadcast transmissions 3 and are able to separately process content flow 26 and the Service Guide flow 28.

Figure 2B:
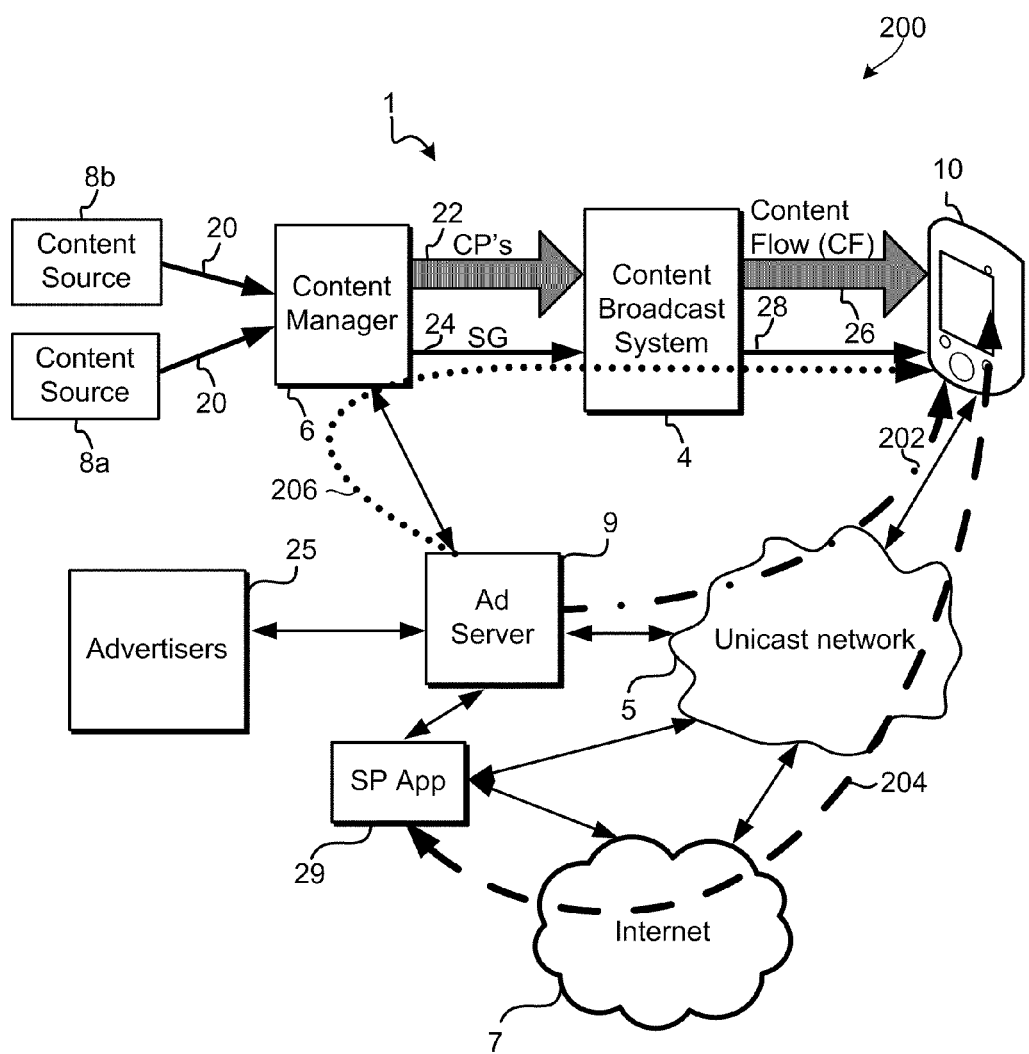
FIG. 2B illustrates alternative advertising content delivery paths via the communication system illustrated in FIG. 2A.

FIG. 2B illustrates two conventional mechanisms by which mobile advertising services may deliver ad content to mobile devices. First, a mobile advertising service provider, employing an ad server 9, may deliver advertisements received from advertisers 25 directly to mobile devices 10 by transmitting them directly (transmission 202) via the unicast network 5 with which the user has an account. In this mechanism, the advertisements may be delivered directly to a mobile device 10 without the user's involvement. Received advertisements may then be cached for display at an appropriate time on the mobile device 10. A second mechanism by which mobile devices may receive advertisements from a mobile advertising service involves establishing a data call with a Service Provider Application server 29 ('SP App' server) which may be in communication with an ad server 9 via the Internet 7 and the user's unicast network 5. The SP App server 29 communicates directly with the user's mobile device over the Internet 7 via the user's unicast network 5, as well as interacting with the ad server 9 to obtain suitable ads to provide to the user. In this second mechanism, the mobile device 10 establishes a communication link 204 with the SP App server 29 and requests delivery of advertisements via the established communication link 204. Received advertisements are then cached within the mobile device for display at an appropriate time.

The various embodiments provide a third mechanism 206 by which advertisements may be received from an advertising service. This third mechanism 206 leverages the high bandwidth broadcast capacity of mobile broadcast systems, and additionally, employs targeted content reception mechanisms, such as that defined in the OMA BCAST standard. By providing selective content reception capabilities in the broadcast client (e.g., a BCAST Client) executing in the receiver devices 10, ad content, such as mobile advertisements, can be delivered to mobile devices 10 quickly and efficiently (for example, in accordance to mechanisms defined in the OMA MobAd standard). In the various embodiments, advertisements and information regarding the advertisements (i.e., ad content metadata) are provided to a mobile broadcast network, such as to a content manager server 6. This information may be used by the content manager server 6 to generate messages including attributes about those advertisements which will be broadcast in the future. The advertising attributes may be transmitted within the metadata flow which carries the Service Guide 24, 28 (or another overhead flow) of the broadcast system for reception by mobile devices 10. The broadcast advertising attributes and other advertising metadata enable receiving devices 10 to prepare to receive and filter ad content that will be broadcast at a later time. Using the previously received advertising attributes, mobile devices 10 can then determine which of the broadcast advertisements to receive, in a manner similar to how other broadcast content is received. At the designated time, the advertisements are transmitted by the broadcaster within the content flow 26 for reception by mobile receiver devices 10. Received ad contents may then be provided to an application client of the broadcast client in the device, such as the Ad Engine defined in the MobAd standard. The application client can in turn deliver received ads to an end-user application for subsequent display, under the control of that application. Thus, the third delivery mechanism 206 leverages the services and capacity of mobile broadcast networks to efficiently distribute advertising content, as well as other forms of application content.

The various embodiments enable use of the large bandwidth capability of mobile broadcast services (e.g., mobile broadcast TV, digital radio, filecast services, etc.) for distributing advertising content for processing and delivery by an advertisement-specific application client. The content filtering capabilities of a mobile broadcast receiver device enable advertising content to be received, using the advertising metadata and various rules, as may be communicated in the Service Guide or in a download auxiliary data triggered notification. By sending advertising metadata in advance of broadcasting advertising content, mobile devices equipped with the broadcast schedule of advertising content and filtering metadata can selectively download ads that may be relevant to the particular user.

Mobile broadcast services may be used to transmit advertising content using three basic methods. In a first method, the mobile broadcast service is used strictly to broadcast the ad content metadata for reception by mobile receiver devices. A mobile receiver device receiving the ad content metadata provides this information to an advertisement application client, which can use the information to perform the necessary advertisement acquisition, such as via the unicast network 5 and the Internet 7 to fetch selected advertisements from an ad server 9. Since ad content metadata represents a small amount of information, this method represents a minor improvement over the conventional fetch-based advertisement acquisition mechanisms, such as those defined in the OMA MobAd standard (e.g., communication link 204 illustrated in FIG. 2B).

In a second mechanism according to an embodiment, the mobile broadcast service is used strictly to broadcast the ad content for reception by mobile devices. The broadcast client in the mobile device receives the ad content and delivers those ads for processing by an advertisement application client. The advertisement application client may cache the received advertisements in memory and then select particular advertisements from the cache for delivery to an end-user application for subsequent display. While this method leverages the high-bandwidth capability of mobile broadcast services, it requires the device's RF receiver to remain powered on long enough to receive all of the advertising content, even if only a small percentage of that content is relevant to or targeted for the user. Thus, the receiver devices are required to expend extra battery power to receive advertising content that may be of no value to the device user. Since battery life is a limiting factor on battery-powered mobile multimedia mobile broadcast receiver devices, the second mechanism is not deemed to be practical. It is worth noting that many mobile multimedia mobile broadcast receiver devices will not be battery-limited, such as those installed in automobiles. For such receiver devices, the second ad content delivery mechanism may have no negative impact on the user experience.

Various embodiments described herein provide a third mechanism for delivering advertising content to mobile devices via mobile broadcast services that overcomes the disadvantages of the first and second mechanisms described above. In these embodiments, the mobile broadcast service broadcasts advertising metadata in advance of the broadcast of advertising content, and leverages the content filtering and selection capabilities of the broadcast client to determine which advertisements will be received. In this manner, the high bandwidth capacity of mobile broadcast services can be leveraged to deliver advertising content efficiently, while a mobile device's RF receiver is energized only when selected (i.e., filtered) advertising content is being broadcast, thereby conserving battery power. In a further embodiment described more fully below, the Ad Engine may provide filtering data and/or rules effectively overruling the BCAST client's standard or known selective reception filtering criteria, selective reception filtering rules, or both.

Employing the BCAST Client to perform advertising filtering on behalf of the MobAd Ad Engine involves functionality very similar to that of the nominal BCAST Terminal for selecting and filtering generic broadcast contents on behalf of the broadcast service user. If the BCAST Client were to simply download all broadcast advertisements and deliver those advertisements to the Ad Engine, selection of the appropriate advertisements to be returned to the end-user application would be based upon ad selection criteria (including MobAd rules and available advertising metadata), data provided from the advertising application as input in the request for advertisements, and data from the contextualization and personalization capabilities response that is described below. Alternatively, the BCAST Client may perform advertising filtering based upon MobAd rules carried in a download auxiliary data trigger (AuxDataTrigger) notification message, contextual information from the advertising application which may already be known to the advertising engine (e.g., in a previous advertising request or provisioned via an advertising application registration) that is passed to the BCAST Client, and contextualization and personalization capabilities information. As described above, ad content metadata may be broadcast in advance of the ad content. The advertising engine may also post-filter the pre-filtered advertisements obtained from the BCAST Client.

Figure 3:
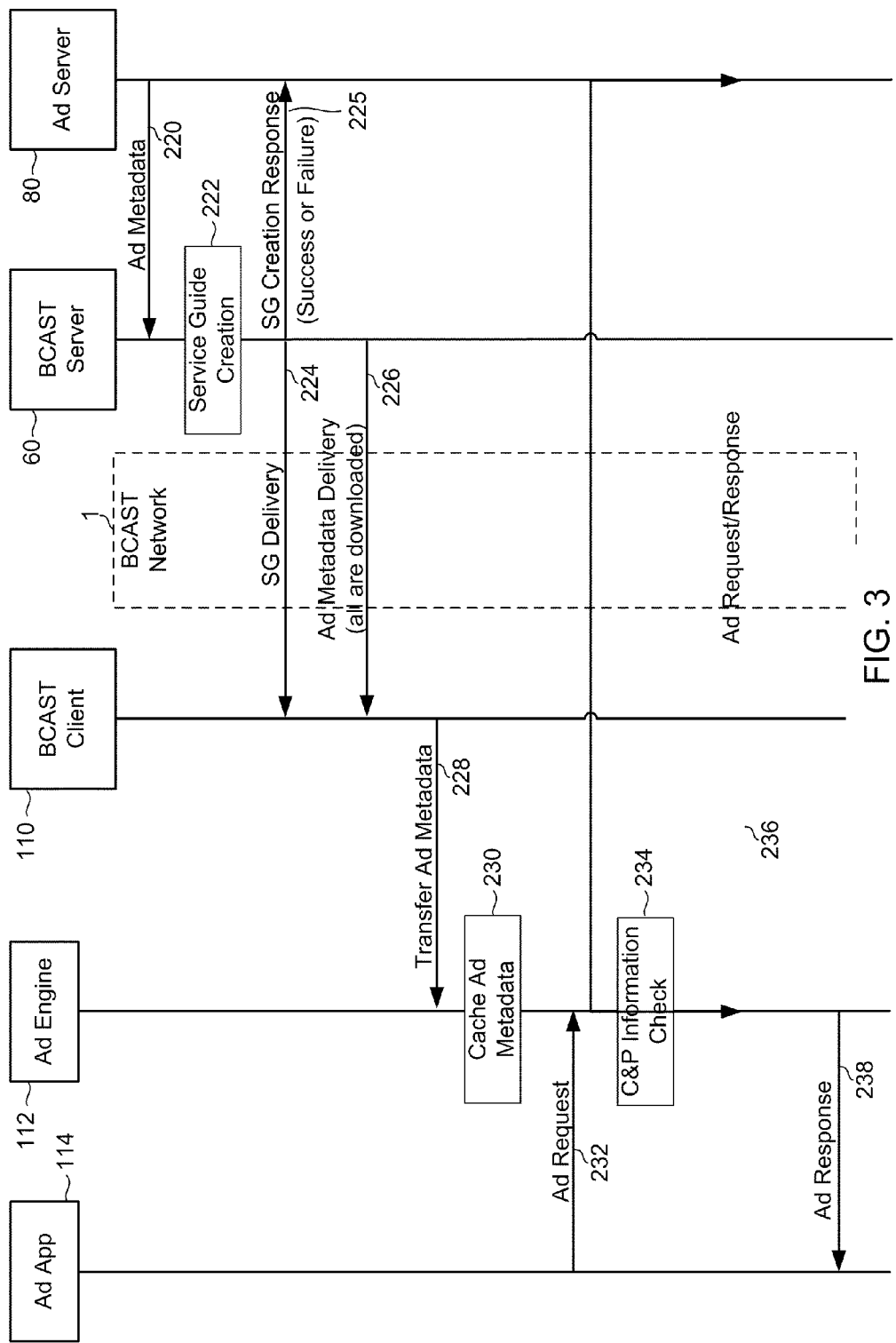
FIG. 3 is a communication flow diagram illustrating example messages that may be exchanged among components and device functional modules according to an embodiment.

FIG. 3 illustrates communication flows that may be utilized in an embodiment in which the broadcast network is used to communicate advertising metadata to mobile devices, which can then request and receive advertising content via the unicast network. In such an embodiment, the ad server 80 may format ad metadata messages and transmit the ad metadata messages to the BCAST server 60 via local area network or Internet messages 220. The BCAST server 60 may incorporate the ad metadata messages into the creation of the Service Guide, process 222, and then broadcast the Service Guide via overhead flow broadcasts in messages 224. The BCAST server 60 may also inform the ad server 80 of the Service Guide creation (or failure) in a Service Guide creation response message 225. In embodiments in which the ad metadata are delivered in separate ad metadata messages, such messages may be broadcast separately in messages 226 as a standalone content file, whose entirety is downloaded by the BCAST Client 110. The BCAST Client 110 within the mobile device receives the metadata messages and transfers the ad metadata to the ad engine 112 via internal data transfer messages 228. The ad engine may cache the received ad metadata, process 230. In response to an advertising request command 232 from an ad application 114, the ad engine 112 may perform a context and personalization information check in process 234 to determine, by matching the ad metadata against the location and personalization information, whether one or more suitable ads are available at the ad server 80 to be fetched and provided to the ad application 114, 232. If the context and personalization filtering criteria are satisfied, the ad engine 112 may access the ad server 80 via the unicast network to request identified ads from the server, and receives the requested ads in messages 236. The ad engine 112 may then provide the requested ad response to the ad application 114 via message 238.

The embodiment illustrated in FIG. 3 provides efficient delivery of advertising metadata to the ad engine 112 within mobile devices. However, to receive advertisements, the mobile device must establish and maintain a two-way data link with the ad server 80 to request and receive particular advertisements. Since the data rate of the unicast network is much less than that of the broadcast network, this embodiment is not particularly efficient, and could result in significant battery drain if a large number of advertisements are requested and received, which may involve a large population of devices.

Figure 4:
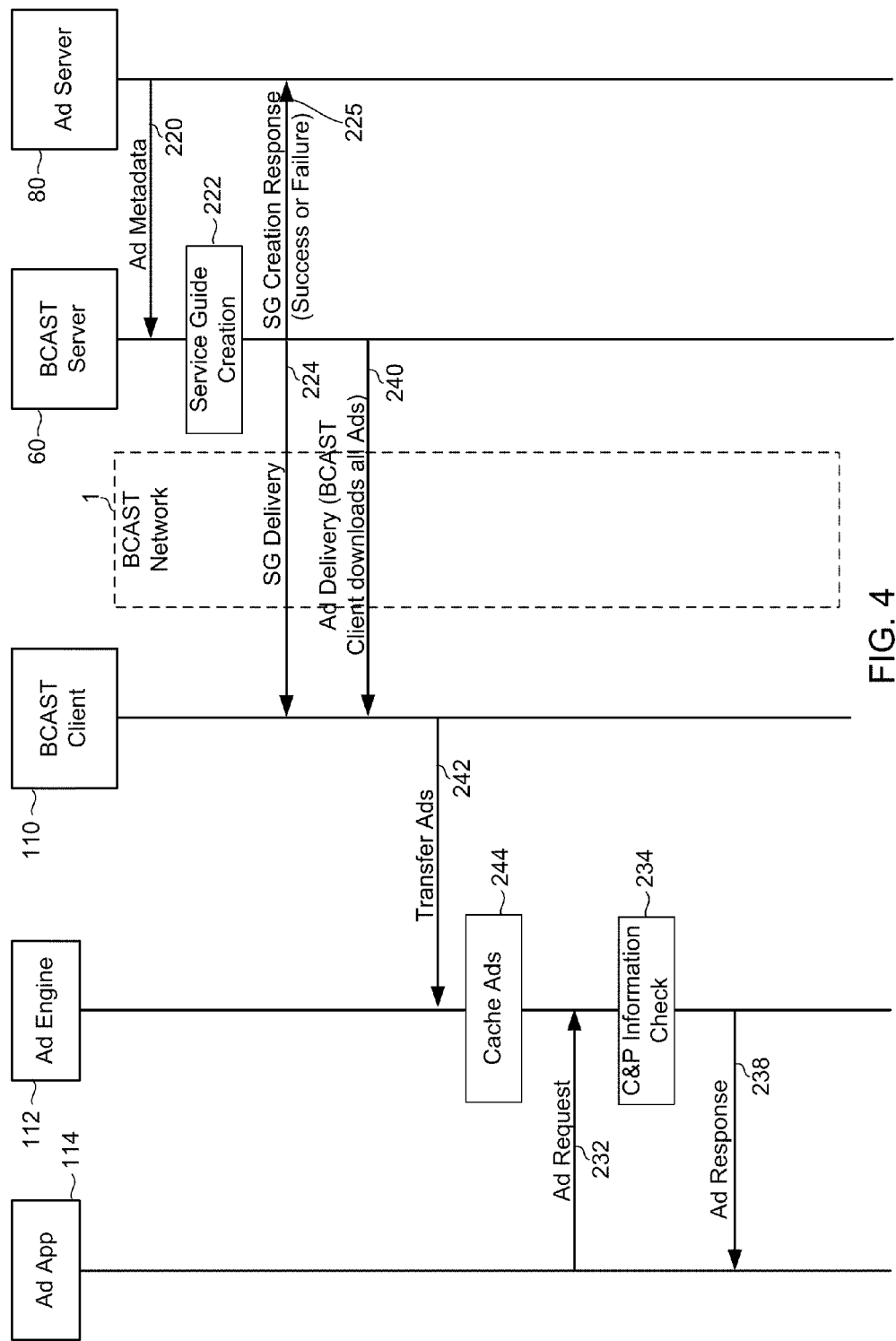
FIG. 4 is a communication flow diagram illustrating example messages that may be exchanged among components and device functional modules according to another embodiment.

FIG. 4 illustrates a second embodiment which uses the broadcast network to broadcast all advertisements to mobile devices where they are cached for local use by an ad engine. In such an embodiment, the ad server 80 may format ad metadata messages and transmit the ad metadata messages to the BCAST server 60 via local area network or Internet messages 220. The BCAST server 60 may incorporate the ad metadata messages into the creation of the Service Guide, process 222, and then broadcast the Service Guide via overhead flow broadcasts in messages 224. The BCAST server 60 may also inform the ad server 80 of the Service Guide creation (or failure) in a Service Guide creation response message 225. The BCAST server 60 also broadcasts all advertisements in messages 240 via the broadcast network 1 for reception by mobile devices. The BCAST Client 110 within the mobile device receives all of the broadcast advertisement content, and transfers received advertisement content to the ad engine 112 via internal data transfers 242. The ad engine 112 caches all of the ads and memory in process 244. When the ad application 114 requests an advertisement in command 232, the ad engine 112 may locate the requested ad within the cached advertising content, and determine whether the requested ad is consistent with the context (such as location of the mobile device) and/or personalization (i.e. user profile) criteria in process 234. Those requested ads contained within the cache of advertising content that meet the context and personalization criteria are provided to the ad application 114 in the ad responses 238.

The embodiment illustrated in FIG. 4 provides an efficient delivery of advertising content since it utilizes the large bandwidth capacity of the broadcast network to broadcast the ad content. However, this embodiment requires that the mobile device radiofrequency (RF) receiver be powered on for the entire duration of the ad content delivery session. This is because the mobile device must download every ad being broadcast so that it can be cached for later selection by the ad application and ad engine. Thus, this embodiment may impact the user experience since the battery life will be reduced. When only a subset of broadcast advertisements will be presented to a particular user, this embodiment method is not energy efficient, thus unnecessarily reducing the time that the mobile device can operate on battery. In addition, a large device cache may be required to temporarily store the broadcasted ads, many of which may not be eventually useful to the ad application.

Figure 5:
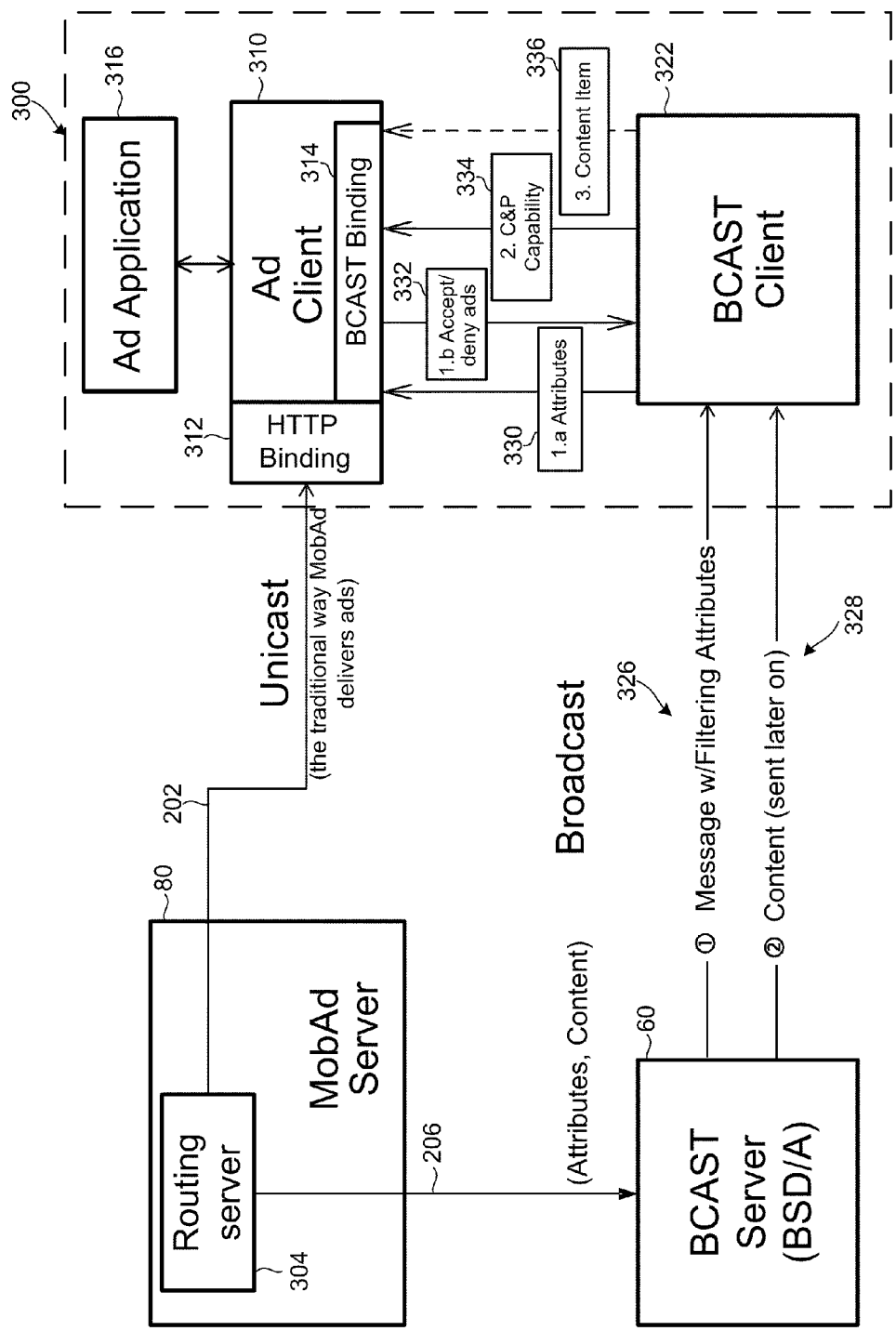
FIG. 5 is functional module system block diagram illustrating communication among components and functional modules according to an embodiment.

The disadvantages of the embodiments discussed above may be overcome by a third embodiment in which the content selection processes of the BCAST Client are leveraged to download only those advertisements deemed as useful to the Ad Engine. FIG. 5 illustrates data transmissions among system and device components and modules that may be implemented in this embodiment. As shown in FIG. 5, a traditional mechanism for delivering mobile content to an ad application 310 within a mobile device 300 may be via unicast communications 202 (e.g., Internet messages) from a routing server 304 within a MobAd Ad Server 80. For example, advertisements may be communicated as Internet messages 202 which may be received by an HTTP binding module 312 of the ad client 310.

The third embodiment enables delivery of advertising content to mobile devices 300 via broadcast transmissions 326, 328 from a mobile broadcast network, such as a BCAST type content broadcast system implementing BCAST service layer functions and including a BCAST Server 60 that provides a Server Service Distribution/Adaptation (BSD/A) function. In this embodiment, advertising content and attributes of the advertising content may be provided to the BCAST Server 60 from a routing server 304 within a MobAd Ad Server 80, via a network or Internet transmission 206. For example, a routing server 304 may periodically transmit advertising attributes and content to be broadcast to the BCAST Server 60, such as in the form of electronic mail or HTTP data communications. Alternatively, advertising content and attributes may be posted on a webpage hosted by the routing server 304, which the broadcast network 320 can access and download via data communications 206.

In the broadcast network 320, advertising attributes may be organized into ad content metadata messages which provide information regarding advertising content that will be broadcast at a later time. The ad content metadata message may then be broadcast in a first broadcast transmission 326, which is received by the BCAST Client 322 within mobile devices 300. Such ad content metadata messages may be broadcast in an information or overhead flow, and will typically be broadcast repeatedly (as are Service Guide transmissions) to ensure that mobile devices are able to receive the metadata messages before corresponding advertising content is broadcast.

In this embodiment, the BCAST Client 322 is configured to pass metadata regarding advertisements received from the ad content metadata broadcasts 326 to an ad client 310 via internal data interface communications 330. Such internal data communications 330 may be accomplished via a communication interface software module 314, which may be provided as part of the ad client 310 to facilitate data exchanges between the BCAST Client 322 and the ad client 310. Using the received ad attributes information, the ad client 310 may select particular advertisements for download. This may be accomplished by sending a command or data messages 332 from the ad client 310 to the BCAST Client 322 which indicate whether a particular advertisement should be accepted or denied. In a variation of this embodiment, the ad selection indication 332 may simply identify the ads which should be received. Such selection criteria may include an identifier for particular advertising content that the BCAST Client 322 can use in conjunction with the received advertising metadata to determine when the receiver should be energized to receive the selected advertising content transmissions. In a further embodiment, the ad client 310 may provide the BCAST Client 322 with ad content selection criteria or filtering criteria for use by the BCAST Client in determining the broadcast ad content that should be received.

Sometime after transmission of the ad content metadata messages 326, the broadcast network 320 broadcasts the advertising content in broadcast transmissions 328. The BCAST Client configured according to the various embodiments may use the advertising selection criteria provided by the ad client 310 in data messages 332 in conjunction with the received ad content metadata, or any other filtering data locally available to identify broadcast times for selected advertising content. In other words, the BCAST Client may also have local access to contextualization or personalization information to assist content filtering, similar to the 'C&P Information Check' performed by the Ad Engine as shown in FIGS. 3 and 4. Using mechanisms and processes within the BCAST Client 322 used for receiving selected broadcast ad content, the BCAST Client 322 can energize the receiver circuitry at the appropriate time to receive broadcast transmissions of the selected advertising content. The received selected advertising content may then be provided to the ad client 310 via internal data communications 336.

In an embodiment, reception or use of advertising content may be limited to (i.e., filtered) to advertising content which is contextually relevant (e.g., relevant to the present location of the receiver device) and personally relevant (e.g., relevant to the user as may be defined by a user profile). This relevancy filtering is referred to as "C&P" filtering in the drawings. In order to inform the ad client 310 of the contextualization and personalization filtering capabilities of the BCAST Client, such as the ability to receive GPS location information from a GPS receiver within the receiver device 300 or access to user profile settings, the ad client 310 may request the BCAST Client 322 to inform it of its contextualization and personalization (C&P) filtering capabilities, which may be provided in data communication 334. The communication of C&P capabilities may be accomplished either via built-in C&P intelligence in the BCAST Client, or via a mechanism for the BCAST Client to acquire such info from another resource. This data exchange enables the ad client 310 to be informed about the capabilities of the BCAST Client 322 to apply context and personalization filtering. This information is important because if the BCAST Client 322 does not have access to a GPS receiver or a broadcast cell identification (which depends on the hardware configuration), the BCAST Client 322 cannot apply good location filtering of advertising content (i.e., determining whether to energize the receiver circuitry in order to receive an ad based upon its location or context relevant). Similarly, if the BCAST Client has no user profile information, or such information is incomplete, the BCAST Client 322 cannot apply good user profile filtering of advertising content (i.e., determining whether to energize the receiver circuitry in order to receive an ad based upon its relevance to user profile criteria). Furthermore, data communication 334 enables the ad client 310 to be informed of nominal ad filtering behavior by the BCAST Client, and modify that behavior as necessary, such as in case where the ad client has more up-to-date C&P information than the BCAST Client. As an example, even though user personalization data in C&P suggests a certain profile in user interests or behavior, recorded measurement of actual ads requests from the ad app 316 indicates that quite different filtering rules should be applied. If the BCAST Client lacks built-in in or accessibility to C&P information, the Ad Engine may independently obtain such C&P information as described above with reference to FIGS. 3 and 4.

To accomplish the exchange of contextualization and personalization filtering capabilities data (data communication 334), the ad client 310 may be configured to perform a "get" operation to obtain information on the localizing information and user attributes available to the BCAST Client 322. Also, the Ad Client 310 may be configured to perform a "set" operation to set user attributes or set the location criteria. This is referred to as a "C&P GET/SET" capability in the drawings.

The set C&P operation provides an example of how, in an embodiment, an ad client may contain resident filtering data which it provides to the broadcast client such that selective reception, based on those provided filtering data, overrides similar filtering metadata that the broadcast client has available or would otherwise be used by the BCAST Client 322. In a further embodiment, the ad client can provide new rules or selection metadata for controlling content selective reception to the broadcast client, effectively overriding default or existing filtering criteria and rules. By providing new rules or selection metadata to the BCAST Client 322 that were previously unknown the BCAST Client, the Ad Client 310 can cause the BCAST Client 322 to behave in a new manner. Thus, as mentioned above, the set C&P capability enables the ad client to overrule the broadcast client's standard selective reception filtering criteria, selective reception filtering rules, or both.

Figure 6:
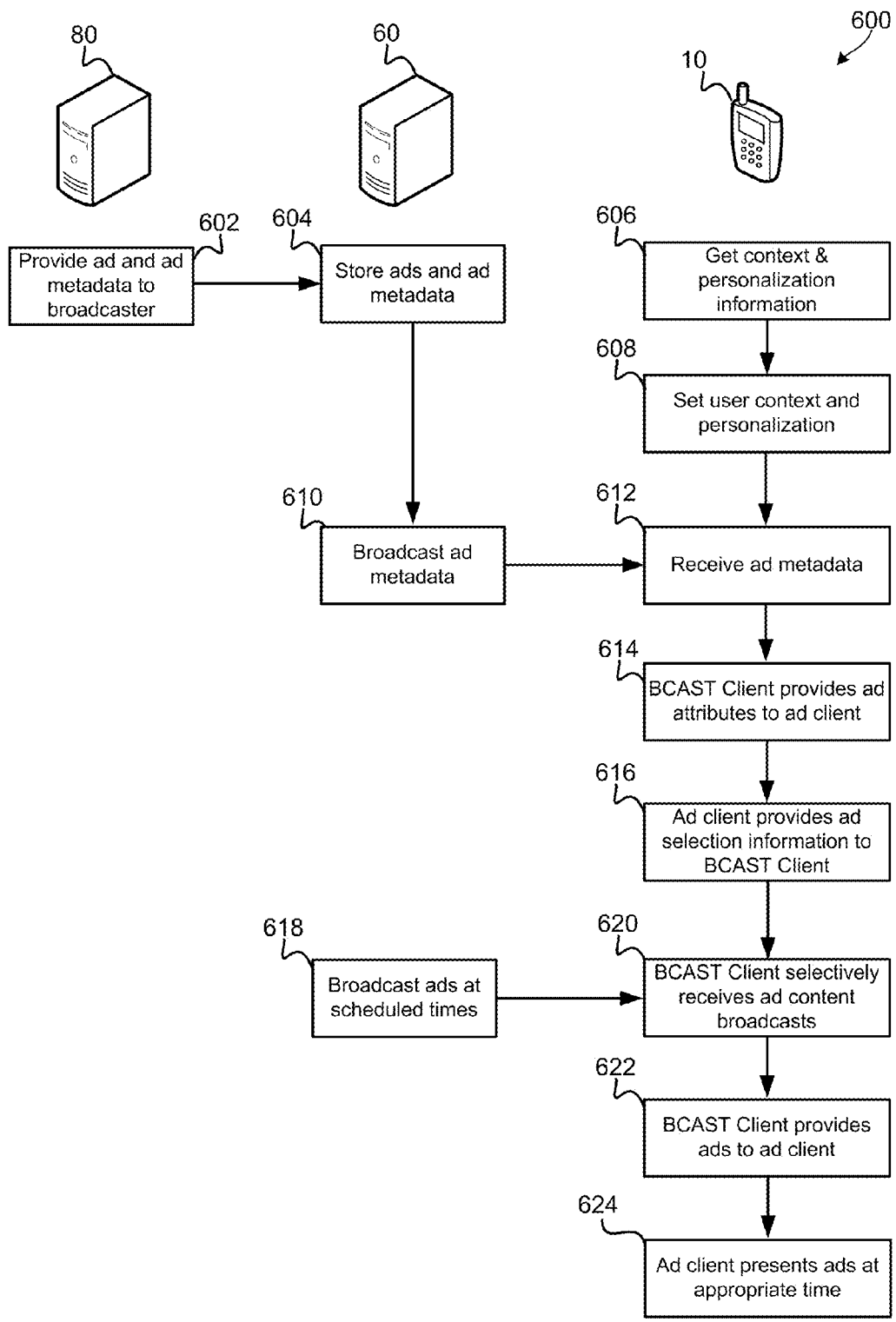
FIG. 6 is a process flow diagram illustrating a method for delivery and reception of mobile advertising content according to an embodiment.

Processes that may be implemented in this embodiment are illustrated in FIG. 6 which illustrates an example method 600 that may be implemented by receiver devices 10. In method 600 at step 602, an ad server 80 may provide advertising content and ad content metadata (including attributes of the advertising content) to the broadcaster, such as via a local network or the Internet. The broadcaster server 60 may receive and store the advertising content and the ad content metadata. Using the received ad content metadata, the broadcast server 60 may generate ad content metadata messages for broadcast step 610.

In method 600 at step 606, the mobile devices 10 may prepare to receive advertising content by the ad application requesting and receiving context and personalization capability information from the BCAST Client. In response, the ad application client may set some context and user personalization settings in the BCAST Client in step 608. So configured, mobile devices 10 may receive the broadcast ad content metadata messages from an overhead or metadata flow within broadcast transmissions in step 612. In step 614, the BCAST Client provides ad content attribute information included within the received ad content metadata to the ad application client. In step 616, the ad application client determines the advertising content that should be received or selection criteria for selecting advertising content based upon the ad content attribute information, and provides one or more advertising content selection criteria to the BCAST Client. As mentioned above, such advertising content selection criteria may be in the form of an identifier for one or more particular advertising content broadcasts as may be identified in the received ad content metadata. Additionally or alternatively, the selection criteria may specify particular attributes or attribute values to be compared to content attributes as included in ad content metadata to select for reception those content broadcasts whose attributes satisfy the selection criterion or criteria. This prepares the BCAST Client to receive the selected advertising content when it is broadcast by the broadcast network.

At a later time, in step 618, the broadcast network 60 broadcast advertising content in accordance with the schedule indicated in the ad content metadata messages. When advertising content is broadcast, the BCAST Client may selectively energize the receiver circuitry to receive the selected advertisements in step 620. This selective perception of advertising content may be based upon the advertisements selected by the ad application and communicated to the BCAST Client in step 616, or based upon selections made by the BCAST Client using the selection criteria provided by the ad application.

The selective reception of advertising content in step 620 may also be based upon the application of filtering criteria within the BCAST Client such that only selected advertisements which are also contextually and personally relevant are received. In this embodiment, the BCAST Client may compare current location information to location relevance attributes or selection criteria for selected advertising content at the time that the selected advertising content is scheduled for broadcast to determine whether the advertisement is currently relevant to the location context. As mentioned above, the location relevance attributes of advertising content may be included in the ad content metadata messages previously received. This process check ensures that the receiver circuitry is only energized to receive selected advertising content that is relevant to the present location of the mobile receiver. For example, if user settings have indicated to the ad client the user is interested receiving advertising content including coupons for pizza parlors, the BCAST Client may compare the current location of the mobile receiver device to location relevance attributes for pizza parlor advertising content that is about to be broadcast to determine whether the device is located close enough to a pizza parlor advertiser for the advertisement to be useful to the user. In a further embodiment, the BCAST Client may compare metadata for advertising content selected by the ad application client that is about to be broadcast to determine whether the advertisement matches user selection criteria, and thus is also personally relevant. For example, the user profile may specify time periods in which certain kinds of advertisements may be accepted, desired or should be blocked, in which case the current time of the broadcast may be compared to the user profile settings to determine whether the advertisement content should be received.

In step 622, the advertising content that is received by the BCAST Client is provided to the ad client via an internal data exchange. The ad application client may then process the received advertising content in the normal fashion, such as presenting the ads on a display of the mobile device at an appropriate time.

This embodiment makes use of the high-level MobAd to BCAST adaptation architecture that provides an airlink resource-efficient mechanism for distributing advertising content. Each receiver device may be configured to download and cache only those advertisements which its ad application deems are appropriate for reception.

This embodiment implemented within a BCAST-compliant broadcast system may support two complementary methods for delivering and selecting advertising content: A user-subscribed ad service method; and a non-subscribed ad service method.

Figure 7A:
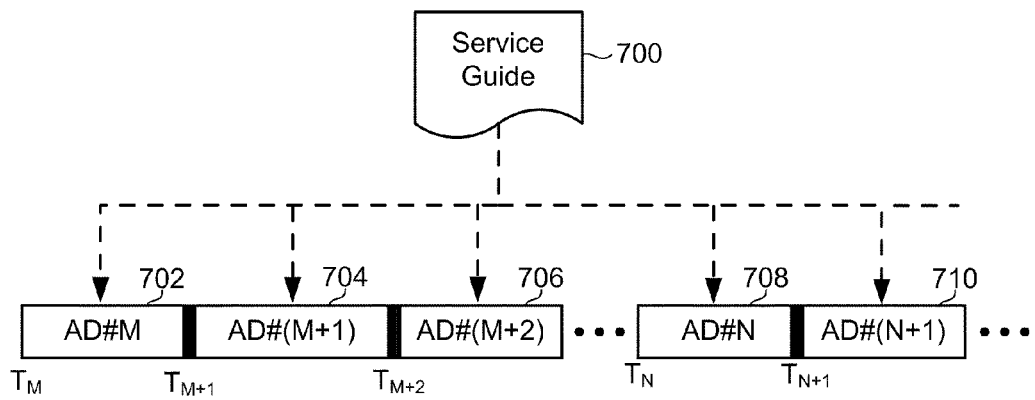
FIGS. 7A and 7B are alternative data structures for delivery of advertising metadata as part of broadcast Service Guide metadata according to an embodiment.

In the first method, users and/or their mobile device may subscribe to a broadcast advertisement service (i.e., a user-subscribed ad service). In this method, broadcast advertisement content are selectively downloaded and stored by the receiver device on the user's behalf according to user and/or network defined metrics, selection criteria and/or attributes. Selected downloaded ads stored on the mobile device may then be displayed at a later time during its associated presentation window, as may be defined by the ad application. To support the user-subscribed ad service, the broadcast advertising content may be treated as a subscribe-able content, similar to how file downloads and cache cast services are identified and received in BCAST today. Thus, the BCAST-defined service provisioning procedures may be used to selectively receive selected ad content. Individual ad content as part of the advertising service may be associated with targeted filtering criteria and the Service Guide as illustrated in FIG. 7A. In this embodiment, the Service Guide 700 includes a plurality of ad content metadata elements 702-710, which provide the attributes and other information that the mobile receiver device can use to determine whether particular advertising content should be received. In other words, in the user-subscribed ad service, the Service Guide provides all of the relevant information necessary for the mobile device to make the ad download decision. The mobile receiver device then uses the filtering criteria to determine whether or not to download and store a particular ad during its scheduled broadcast window as defined in the Service Guide 700. In this manner, advertising content can be selectively received much like other downloadable content.

Figure 7B:
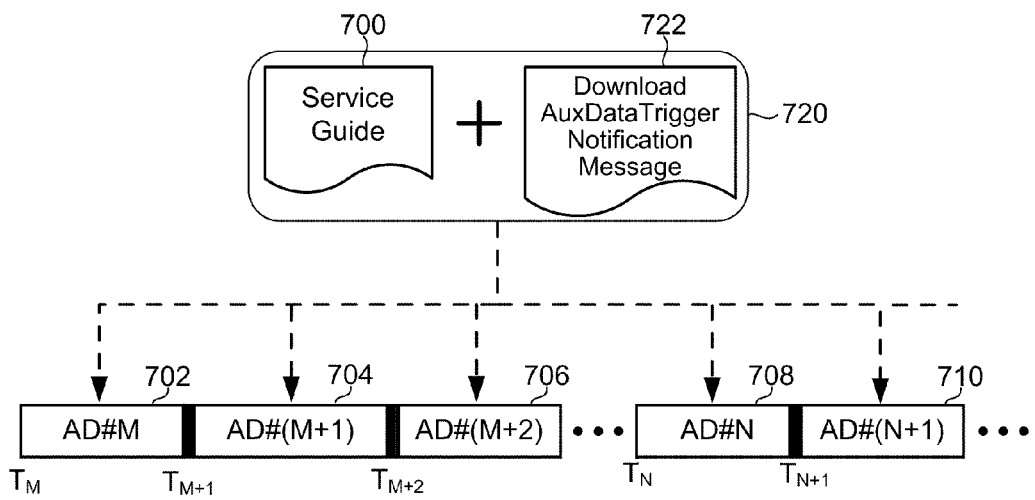

In the second method, advertising content may be delivered to mobile receiver device unbeknownst to users (i.e., in a non-subscribed ad service), with selective downloading and caching of advertising content based on user and/or network defined selection criteria. To support this method, the Service Guide may include information which indicates the presence of an "auxiliary data" service and a delivery schedule of the corresponding advertising content items (i.e., individual ads). Thus, an auxiliary data notification message 722, refer to herein and in the figures as an "AuxData Trigger" notification message, may be broadcast in conjunction with the Service Guide 700 in the overhead or metadata flow broadcast 720 as illustrated in FIG. 7B. The AuxData Trigger notification message 722 includes metadata information 702-710 which points to individual ad content (e.g., providing broadcast time and broadcast channel or flow number) and supplies associated filtering information and criteria. Upon receiving the AuxData Trigger notification message 722, the mobile receiver devices can determine whether a particular ad matches user selection criteria, and therefore should be received and stored. Thus, in the non-subscribed ad service, the Service Guide 700 and the AuxData Trigger notification message 722 jointly provide the necessary information for mobile receiver devices to determine whether particular ad content should be received.

In both of the foregoing methods, the advertising metadata may be broadcast in the Service Guide 700 in the form of FLUTE/ALC sessions delivered over UDP on multicast IP address x/port y. Advertising metadata broadcast using the AuxData Trigger notification message are sent over UDP port m on multicast IP address n. It is worth noting that whereas the Service Guide is delivered as a file using FLUTE/ALC session, the AuxDataTrigger notification message is not sent as a file.

Figure 8:
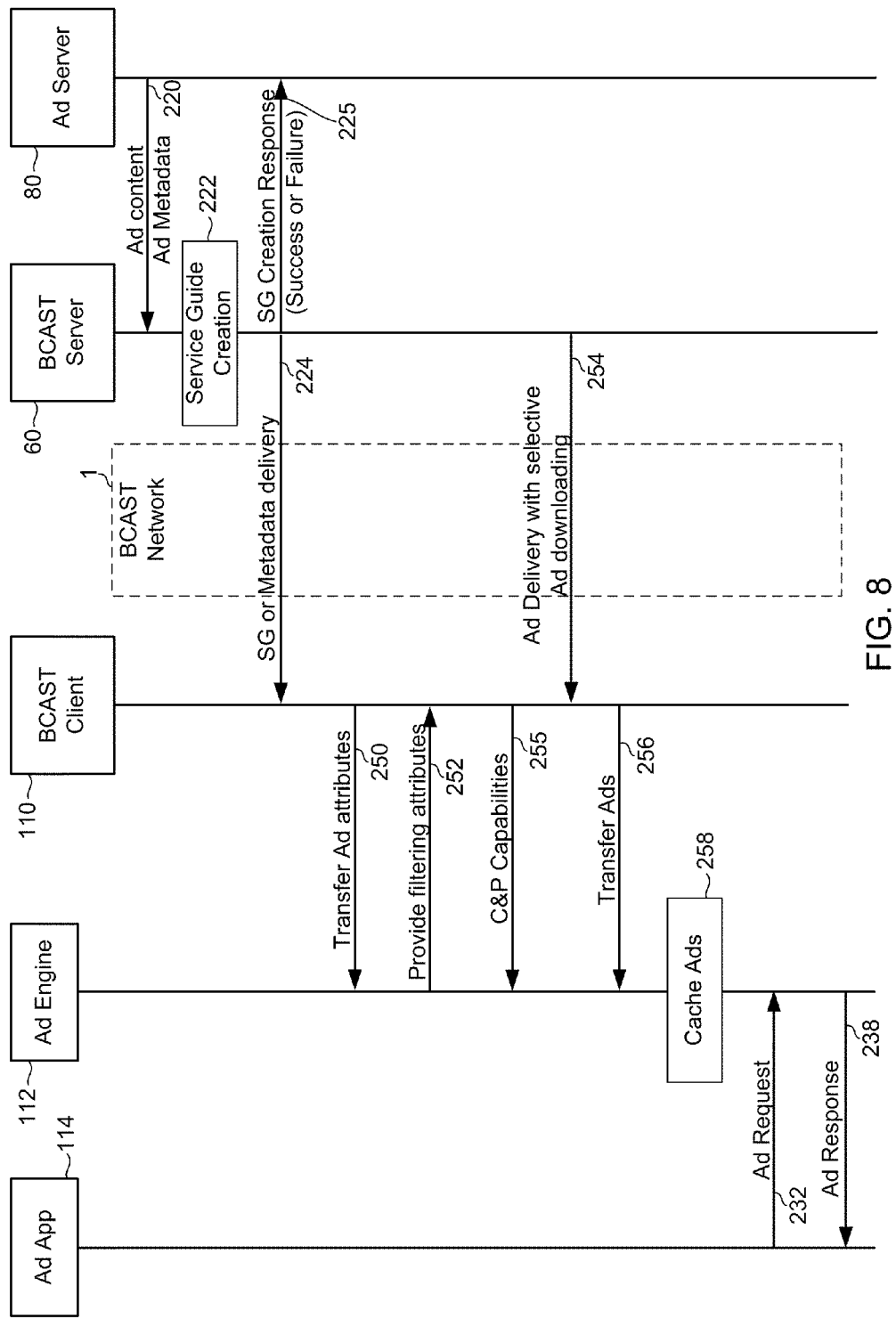
FIG. 8 is a communication flow diagram illustrating example messages that may be exchanged among components and device functional modules according to an energy-efficient embodiment.

FIG. 8 illustrates messages that may be broadcast and exchanged among system components and software modules in the user-subscribed ad service method. As described above for other embodiments, an ad server 80 may provide ad content and ad metadata to a BCAST server 60 in a network or Internet communication 220. Using the received ad content metadata, the BCAST server 60 may create the Service Guide in step 222, which is included in the Service Guide broadcast 224. When the ad content metadata is included in the Service Guide, the BCAST server 60 may also inform the ad server 80 of the Service Guide creation (or failure) in a Service Guide creation response message 225. In the mobile device, the BCAST Client 110 receives the Service Guide transmissions, parses the information in the Service Guide and transfers the included ad attributes to the ad application engine 112 in internal data exchange 250. In response, the ad engine 112 may provide filtering attributes or selection criteria in internal data exchange 252 to the BCAST Client 110. Such filtering attributes or selection criteria may include identification of ads selected for reception, and/or other filtering attributes to be applied by the BCAST Client 110. The BCAST Client 110 may also provide the Ad Client 310 with its contextualization and personalization (C&P) filtering capabilities in internal data exchange 255.

At the scheduled time for broadcast, the BCAST Server 60 may initiate the broadcast of advertising content in broadcast transmissions 254. The broadcast advertising content is selectively received by the BCAST Client 110 based upon the received filtering attributes and the ad content metadata included in the Service Guide. Received ads are then communicated to the ad engine 112 in internal data exchange 256. The ad engine 112 may then caches the ads in memory in step 258. Thereafter, the ad application 114 may request particular ads from the ad engine 112 in requests 232, in response to which the ad engine 112 may provide the corresponding stored ad content in data exchanges 238.

Figure 9:
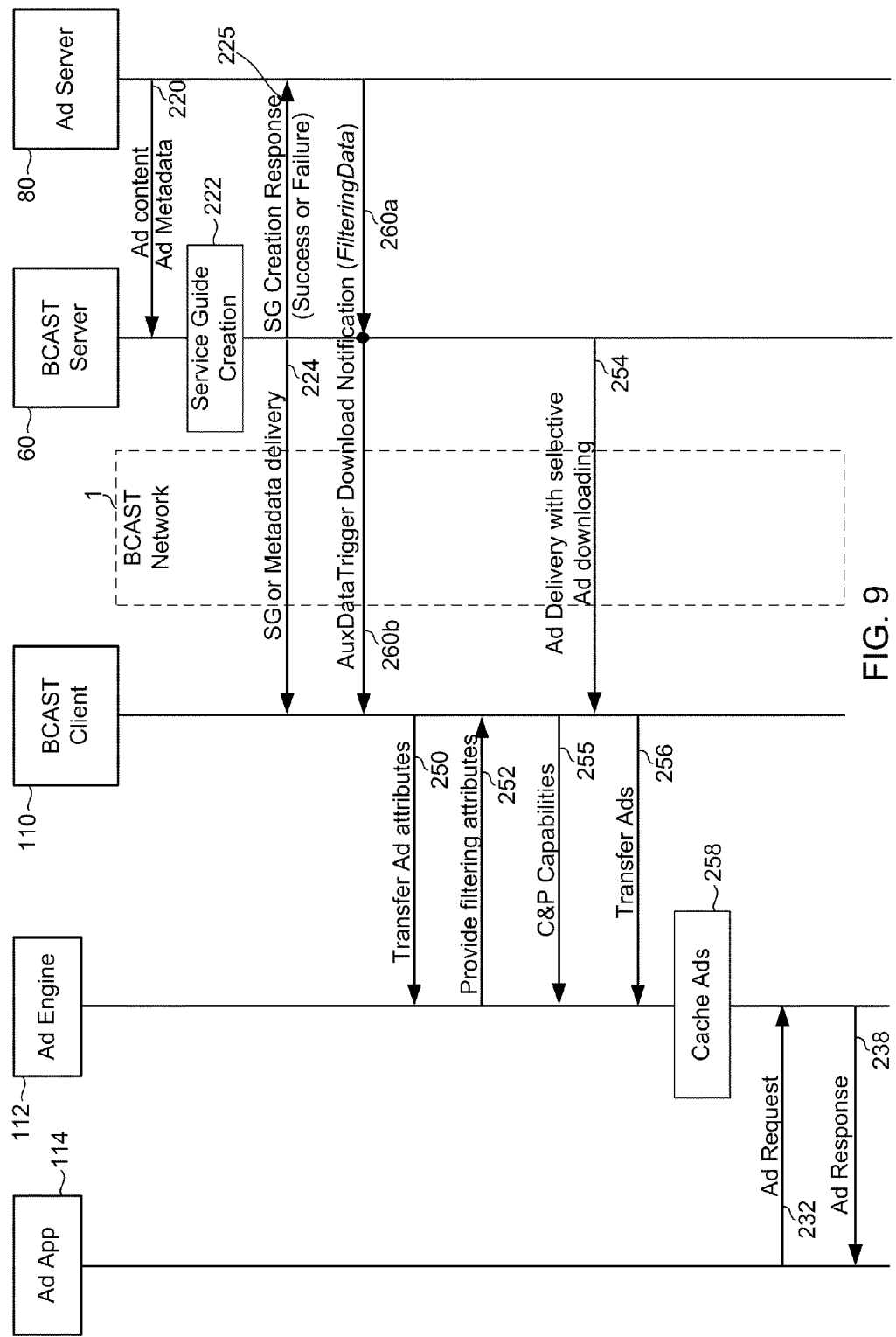
FIG. 9 is a communication flow diagram illustrating example messages that may be exchanged among components and device functional modules according to another energy-efficient embodiment.

FIG. 9 illustrates messages that may be broadcast and exchanged among system components and software modules in the non-subscribed ad service method. As described above for other embodiments, an Ad Server 80 may provide ad content and ad metadata to a BCAST Server 60 in a network or Internet communication 220. Using the received ad content metadata, the BCAST Server 60 may create the Service Guide in step 222, which is that broadcast in Service Guide broadcast 224. When the ad content metadata is included in the Service Guide, the BCAST Server 60 may also inform the Ad Server 80 of the Service Guide creation (or failure) in Service Guide creation response message 225. The Ad Server 80 may then communicate an AuxData Trigger notification message to the BCAST server 60 in network message 260a, which the network broadcasts in broadcast transmission 260b. The AuxData Trigger notification message may include additional ad content metadata not included in the Service Guide, such as additional filtering data. It may also carry dynamic changes to ad metadata attributes previously sent in the Service Guide. In the mobile receiver device, the BCAST Client 110 receives the Service Guide transmissions 224 and the AuxData Trigger notification message 260a, and parses the information in the Service Guide and the AuxData Trigger notification message to obtain ad attributes. The obtained ad attributes are transferred to the ad application engine 112 in internal data exchange 250. In response, the ad engine 112 may provide filtering attributes or selection criteria in internal data exchange 252 to the BCAST Client 110. Such filtering attributes or selection criteria may include identification of ads selected for reception, and/or other filtering attributes to be applied by the BCAST Client. The BCAST Client 110 may also provide the Ad Client 310 with its contextualization and personalization (C&P) filtering capabilities in internal data exchange 255.

At the scheduled time for broadcast, the BCAST Server 60 may initiate the broadcast of advertising content in broadcast transmissions 254. The broadcast advertising content are selectively received by the BCAST Client 110 based upon the selection criteria and filtering attributes and the ad content metadata included in the Service Guide. Received ads are then communicated to the ad engine 112 in internal data exchanges 256. The ad engine 112 may then cache the ads in memory in step 258. Thereafter, the ad application 114 may request particular ads from the ad engine 112 in request 232, in response to which the ad engine 112 may provide the corresponding stored ad content in data exchange 238.

In both of the foregoing methods, the receiver device controls the advertising content downloading and caching to enable personalized and targeted advertising as defined by OMA MobAd or similar mobile advertisement services. Both methods enable the receiver device to limit the time that the receiver circuitry is energized to receive advertising content to just those times when selected and relevant advertisements are being broadcast. Furthermore, both methods minimize the required size of the ad cache at the receiver device since not all of the broadcaster ads need to be downloaded. Thus, both methods conserve device battery power and enable ad application specific memory savings, while taking advantage of the large bandwidth capacity of broadcast transmissions such as those of broadcast networks which include the BCAST service layer functionality.

In order to enable various arguments, an interface may be added to the ad engine to enable that software module to interface with the BCAST Client. This interface may request the availability of ad services and/or auxiliary data service carrying ads. The interface may also request the BCAST Client to subscribe to a desired ad delivery service. The interface may then receive from the BCAST Client downloaded ad content metadata and ad content.

In the various embodiments, two different methods may be used to identify an application client, such as an ad client, to the BCAST Client. In a first method, a ServiceType value may be included in the Service fragment of the Service Guide. In a second method, a client application value ("clientApplication") may be included in the service object.

In the first method, each broadcast service is associated with a unique ServiceType. In BCAST, subscription is performed on a service package basis (referred to in the BCAST standard as a "Purchase Item"). A service package comprises one or more services, each of which is described by a Service fragment, including the identification of each service by a service type. There are currently fourteen assigned service types defined in BCAST, including: (1) basic TV, (2) basic radio, (3) cache cast (auto-recorded basic TV), (4) filed download, (5) terminal provisioning, (6) TBD (changed to managed objects), (7) auxiliary data, and (128) MobAd.

An application client of the BCAST Client must first determine if content could ever arrive for itself. For content to arrive, that application client must subscribe to a service. An example script by which an application client can subscribe to a MobAd service in the various embodiments includes:

```
extern boolean IsSubscribedToServiceType(ServiceType svc_type);
// a service has a type (e.g. "MobAd" = 128, "DM" = xxx, etc.). This function returns
// true if the terminal is subscribed to at least one instance of a service with the given
// svc_type.
extern boolean isSubscribedToAppService(ClientApplicationType app_type);
// a service has a type (e.g. "ApplicationCast"). This function returns true if the
// terminal is subscribed to at least one instance of the subtype with the given app_type.
extern boolean IsSubscribedToServiceID(ServiceIDType service_id);
// a service is uniquely named by its ID, e.g. in DVB-H, for ServiceType "streaming"
// = 4, there might be separate IDs for "basic cable" (maybe 3128101092) and
// "enhanced cable" (maybe 4021091023). This function returns true if the service
// given by the service ID is currently subscribed.
extern errorType SubscribeToServiceID(ServiceIDType service_id);
// The BCAST application may find there is no service that is subscribed. It may try
// to initiate a subscription with this function call. If there is a monetary cost the user
// may be prompted for approval. The function returns zero on success, or non-zero
// (an error code) on failure.
```

In the second method, a new subtype field is added to the service object which may be referred to as the "clientApplication" field. The clientApplication may be assigned integer values to represent different client applications, such as MobAd, device management (DM), content distribution, multimedia message service, etc. In one approach within a BCAST system, data for all applications may be transported via cache cast, filecast, AuxilliaryData, or some new application-cast Service Type. In another approach, the ServiceCast may be used just for user-interface purposes, and not to distinguish applications. In this approach, there may be more than one instance of each ServiceType in BCAST, such as three services with three unique service IDs, with all of the services being cache cast or Application Cast.

BCAST has two separate mechanisms which can be used to deliver file delivery service content to client applications. In the first mechanism, either the file delivery service is identified by the ServiceType value, or each of the individual contents of the file delivery service is identified by the clientApplication subtype. In addition, content metadata is transmitted in the Service Guide to enable receiver devices to selectively receive content broadcasts. In this first mechanism, content attributes may be communicated in the Service Guide, while the content files themselves are broadcast to receiver devices at a later time using the FLUTE/ALC protocol.

A second mechanism for delivering content to client applications involves the use of the auxiliary data trigger notification message mentioned above. The auxiliary data trigger notification message is a special broadcast message that is sent to the receiver devices informing them of an upcoming file delivery event. The auxiliary data trigger notification message may include the content metadata that receivers can use to determine whether the corresponding file content should be received. Some time later, the corresponding content is broadcast, at which time content attribute filtering is performed by the mobile receiver device, and selected content is received from the broadcast transmissions. In this method, a second message may also be sent at a later time informing the mobile device to display the content.

In both the first and second mechanisms, content filtering attributes are provided to mobile devices to enable them to determine whether particular content should be received. The content filtering attributes may include information relating the content to profiles of targeted users, and/or others relating the content to particular user locations. The target user profile attributes may include information such as target user age or age bracket, gender, service subscription type (e.g., basic vs. deluxe), and other user-specific attributes that may enable targeted advertising and/or reception of device-compatible advertising. Location-based content attributes may be information that relates the content to a particular geographic location or region. Examples of location-based content attributes include geographic coordinates, city name, regional name, state name, geographical boundaries, network coverage areas, particular cellular identifiers, and distances from particular geographic coordinates. Such location-based content attributes enable the delivery of data to "location apps" (i.e., applications which provide services depending upon the location of the mobile device), and delivery of ads that is currently geographically relevant to the user, such as advertisements for business establishments within walking or driving distance from the user at the time the content is broadcast.

Figure 10:
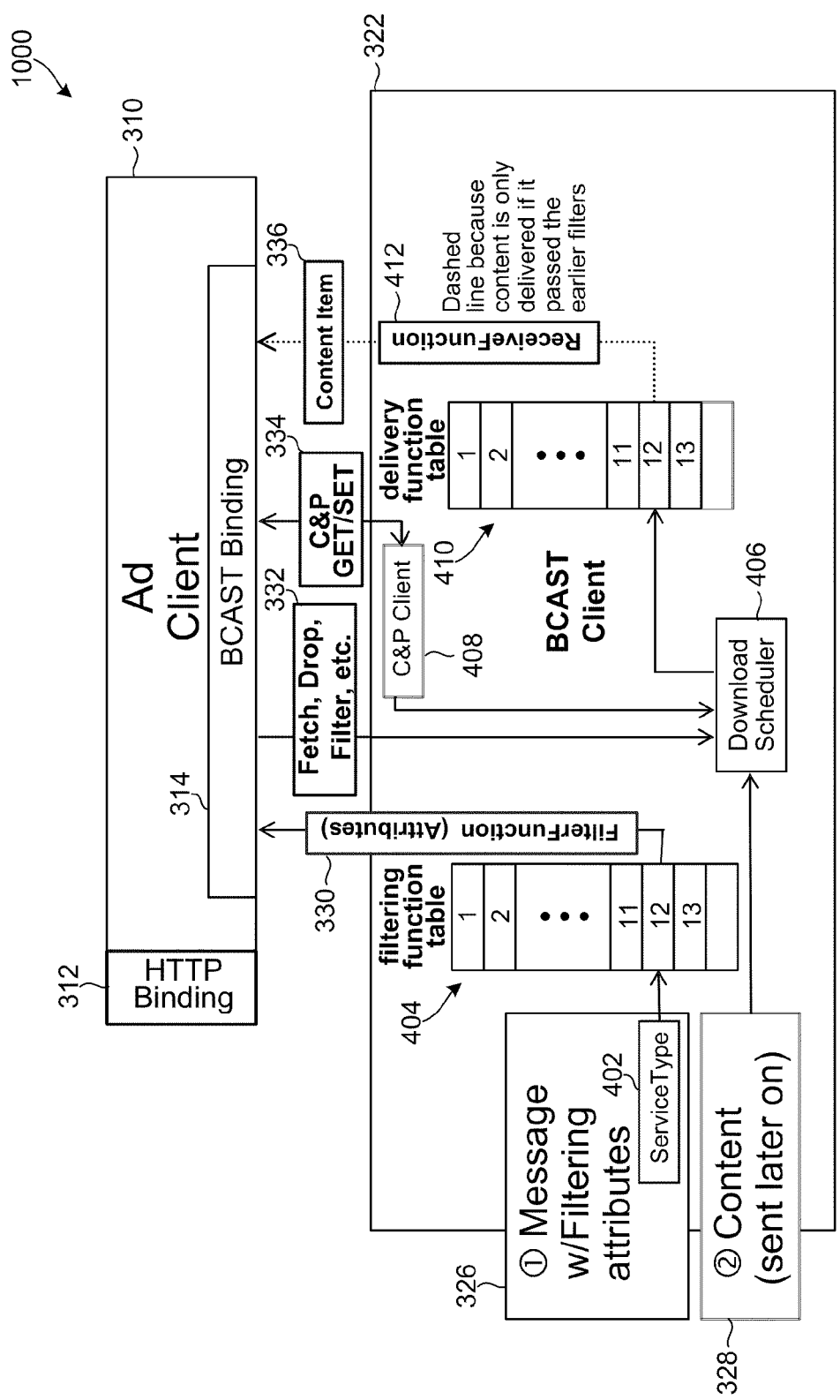
FIG. 10 is a functional module block diagram illustrating functional and data structure elements implemented within a mobile device according to an embodiment.
Figure 11:
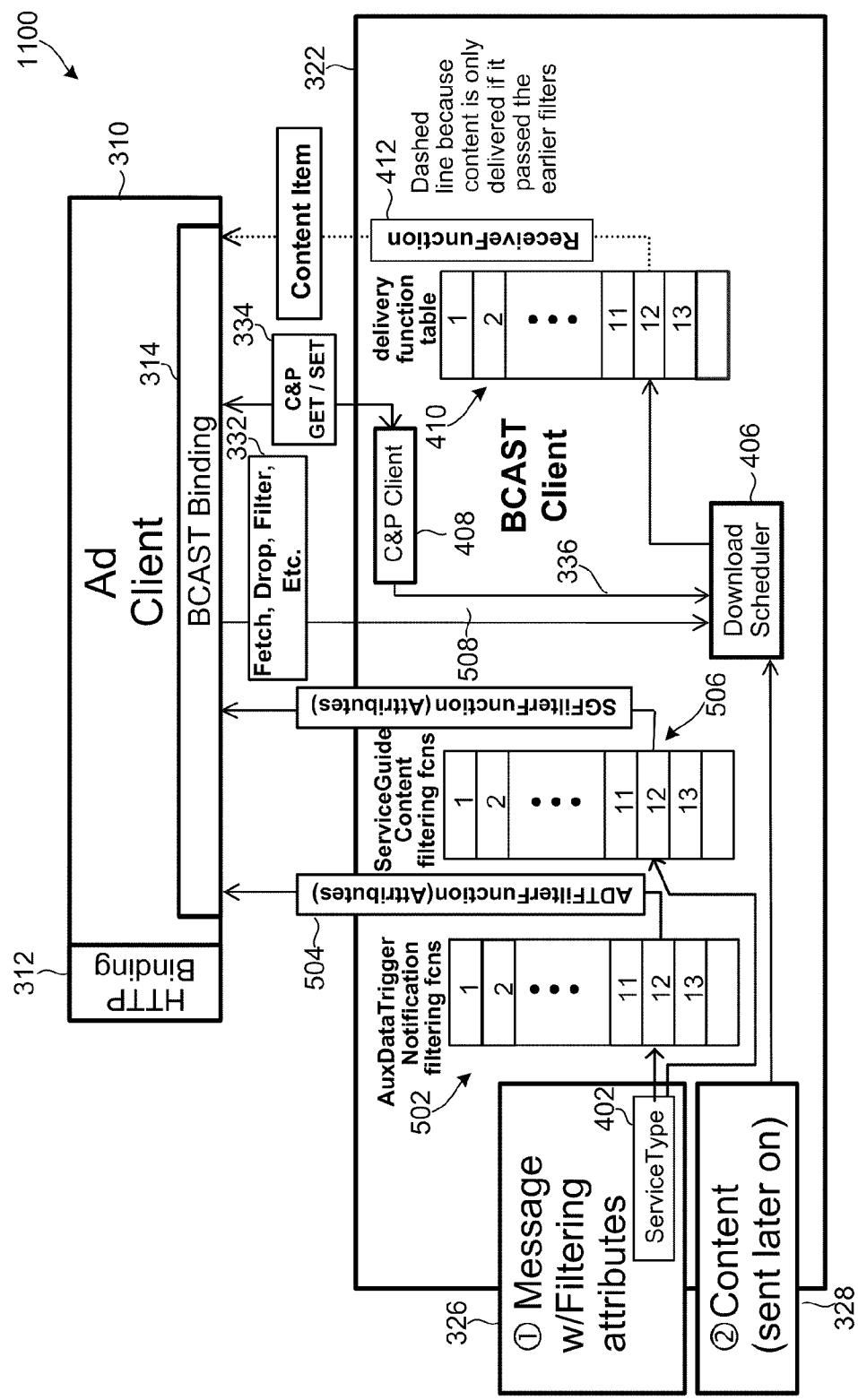
FIG. 11 is a functional module block diagram illustrating functional and data structure elements implemented within a mobile device according to another embodiment.

Content broadcasts may be filtered (i.e., selectively received) based upon one type of attribute, the other type of attribute, or both. FIGS. 10 and 11 illustrate two alternative embodiments of the BCAST Client 322 for filtering content on one or more types of attributes; a single filtering embodiment is illustrated in FIG. 10, and a two-category filtering embodiment is illustrated in FIG. 11.

FIG. 10 shows more detail regarding the mobile device software modules 1000 shown in the right hand portion of the system and module block diagram illustrated in FIG. 5. In this embodiment of the BCAST Client 322, a BCAST application engine provides a single up-call from the BCAST Client to the Ad Client 310, which returns five filtering choices. In this embodiment, messages 326 containing content filtering attributes, such as service types 402, are received. The ServiceType 402 may select a particular BCAST Client that has pre-registered with the BCAST client, storing a FilterFunction pointer 330 in a filtering function lookup table. 404. The BCAST Client then passes subroutine control to the Ad Client 310 with the Message Filtering Attributes 326 as an argument for further filtering. As described above with reference to FIG. 5, the Ad Client 310 may determine one of three or more actions 332 to take with regards to the Content 328 that will be sent later to the BCAST Client 322. Possible actions for the Ad Client to take include Fetching (always receiving) the Content 328, Dropping (not receiving) the Content 328, or Filtering (applying BCAST-layer filters to) the Content 328 A download scheduler module 406 carries out the action requested by the Ad Client 310. The downloader scheduler 406 may also receive criteria from a contextualization and personalization client (C&P Client) 408 which receives settings from the Ad Client 310. The C&P Client 334 may also respond to "get" requests for the contextualization and personalization capabilities of the BCAST Client 322 When the Content finally arrives, the download scheduler 406 uses a separate delivery function table 410 to retrieve a function pointer, which has been pre-registered by the Ad Client, at system startup or at the system of system programming with the BCAST Client. The receive function pointer 412 within the BCAST Client 322 is used to invoke the Ad Client as a subroutine, passing received and filtered content items 336 to the Ad Client 310.

Example C-language bindings that may be used in this embodiment include:

```
enum {
    FilterOnBoth(2),        // apply BCAST-Layer filters
    AlwaysFetch(3),         // don't apply filters - fetch this content item.
    AlwaysDrop(4)           // don't apply filters - drop this content item.
} ContentActionType;
errorType BCAST_Application_Register(
    ServiceType type,
    ContentActionType (*FilterFunction)(istream *xml_attributes),
    void (*ReceiveFunction)(istream *input_file))
);
// This is a BCAST public function that may be invoked by the Ad Client to
// register with BCAST at system startup. The first function pointer is used to
// make a filtering decision for EACH content carried in Service Guide.
// the second function pointer (called much later) gives e.g. MobAd the content item //
that passed the first-function filtering stage.
```

FIG. 11 shows a more elaborate embodiment the embodiment shown in FIG. 10. The principle improvement in FIG. 11 is that there are separate filtering function tables for Content Arrivals announced via AuxDataTrigger Notification messages 502 and via normal Service Guide Content Delivery 506. In this embodiment of the BCAST Client 322, depending upon the arrival route, one of two filtering up-calls from the BCAST Client to the Ad Client 310 are made, each of which returns three filtering choices. In this embodiment, messages 326 containing content filtering attributes, such as service types 402, are received. For content announced with an AuxDataTrigger Notification message, a filtering function table 502 is used to find the appropriate function call (pre-registered by the Ad Client 310), to call with the attributes from both the Content and from the AuxDataTrigger Notification Message itself. For content announced via regular service guide delivery, a filtering function table 506 is used to find the appropriate function call (pre-registered by the Ad Client 310) to call with the message filtering attributes 326 from the service guide. In either case, The Ad Client 310 may determine the particular ad content to receive and/or provide content filtering or selection criteria and pass such information 332 to the BCAST Client 322 which may implement the selection criteria in a download scheduler module 406. The downloader scheduler 406 may also receive selection criteria from a contextualization and personalization client (C&P Client) 408 which receives settings from the Ad Client 310. The C&P Client 334 may also respond to "get" requests for the contextualization and personalization capabilities of the BCAST Client 322. As an alternative to obtaining C&P information from the Ad Client 310, the BCAST Client 322 may receive such data from a local source, such as a device-resident registry of user preferences or profile data that is set or configured by the user.

When content broadcasts 328 are scheduled for broadcast, the download scheduler 406 uses the filtering decision 332 together with the received filtering or selection criteria 336, if applicable, to determine which ad content should be received. When the filtering decision 332 is absolute, e.g. "Fetch" or "Drop", additional selection criteria are not needed to make a download decision. The download scheduler directs the receiver circuitry to energize and receive the content transmissions according to information received in the ad content metadata message 326. The received content is then passed using a subroutine function call pointer 412 retrieved from the delivery function table 410 to the ad client 310. The content need not be stored in the BCAST Client; the Ad Cast receive function may include an argument that is a stream pointer which allows the Ad Client to receive and store the content directly, on its own.

Example C-language bindings that may be used in this embodiment include:

embodiment, the PrivateExt elements may be passed in the up-call from the BCAST Client to the Ad Client as part of the attributes argument. Using this mechanism, filtering of application content may be accomplished according to two embodiments.

In a first embodiment, a Service Guide filter function module within the application client of the BCAST Client, such as the MobAd Ad Engine, may make a filtering policy decision based upon the PrivateExt attributes, such as to receive the content, drop the content, or filter the content using identified filtering/selection criteria or attributes. For example, the Ad Engine may inform the BCAST Client that the ad content should be received (i.e., the receiver circuitry energized at the broadcast time indicated in the content metadata) if the size of the advertisement matches a specified display size limitation of the receiver device, otherwise the ad may be dropped or ignored. Please refer to FIG. 5. To enable this type of filtering, the MobAd ad server 80 or the BCAST server 60 assembling the ad content metadata may place the size of the advertisement display in the PrivateExt data fields. In the receiver device, the Service Guide filter function module may determine from the PrivateExt whether the display size meets the size-based selection criteria, and determine whether the ad content should be received if the size criteria is satisfied or delete the ad content from memory if it has been received and the size criteria is not satisfied. This is but one example of the application of this filtering method, and practically any filtering decision can be accomplished in this or like manner.

In this first embodiment, the PrivateExt field in BCAST lacks a method to prevent XML collisions when two applications share a single BCAST fragment. For example, a Content fragment may contain PrivateExt which may be shared by many different services or applications. This potential conflict can be avoided by designating a service type value (i.e.,

```
enum {
    FilterOnServiceGuideMetaData(0),        // apply Service Guide filters only
    FilterOnAuxDataTriggerMetaData(1),      // apply auxdata trigger filters only
    Filter(2),                              // apply the filter (be it service-guide, or auxdata trigger)
    AlwaysFetch(3),                         // don't apply filter - fetch this content item.
    AlwaysDrop(4)                           // don't apply filter - drop this content item.
} ContentActionType;
boolean ServiceGuideRegister(
    ServiceType type,
    ContentActionType (*SG_Filter_Function)(istream *xml_content_attributes),
    (*Receive-Function)(istream *input_file))
);
boolean AuxDataTriggerRegister(
    ServiceType type,
    ContentActionType (*ADT_Filter_Function)(istream *xml_content_attributes),
    (*Receive-Function)(istream *input_file))
);
```

Filtering of application content, such as ad content, may be supported by the BCAST Service Guide by making use of the private extension field ("PrivateExt") at the end of the Service Guide in the BCAST Content fragment. A "Service" represents a bundle of content items which forms a logical group to the end user. In other words, a "Service can be seen as corresponding to a TV "channel", for which each of the associated content items essentially corresponds to a "program" on that channel. A "Service fragment" contains the metadata (in the form of attributes and elements) describing the particular broadcast service. The last element in a Service fragment is the PrivateExt element. Using the PrivateExt to provide filtering criteria for application content allows a BCAST Service Guide entry to carry metadata that is specific to a particular application client of the BCAST Client. In this ServiceType) that designates the particular application service (e.g. linear TV, radio, or mobile advertisement) for which the Content fragment is provided, and thus for which the PrivateExt value is intended. In an embodiment, Service-Types may be designated with unique textual names, such as "MobAd ad service" may be assigned a unique ServiceType value. Such ServiceType names may be converted to XML tags by converting spaces to dashes, so that "MobAd ad service" becomes "MobAd-ad-service." The ServiceType XML tag may be used within the PrivateExt tag of BCAST to isolate data that is service specific.

In a second embodiment, an application client of the BCAST Client, such as an ad application, may pass specific filter rules or selection criteria to the BCAST Client. Examples of filter rules include: target application type, such as ads for a game, ads for a browser, or ads for a video player; advertisement type, such as Adobe flash, SVG, or blue streak; advertisement format, such as only ads in a particular format should be collected; advertisement size, such as only ads of particular pixel size or display dimensions should be collected; and interactivity model, such as MPEG-4 LASeR, W3C SMIL, etc. For example (FIG. 11), the ad client may pass specific filter rules/selection criteria 334 to the BCAST Client contextualization & personalization module 410 asking for download of ads with a size of 160×160 pixels because this is the size of the display screen of the mobile receiver device. In another example, the ad client may pass specific filter rules/selection criteria to the BCAST Client asking for ads formatted using Adobe flash because this is the only player supported by the ad application. As a further example, the ad client may pass specific filter rules/selection criteria to the BCAST Client asking for ads formatted for a browser because there are no games stored on the mobile device (therefore game format ads are of no utility). While these examples are easily handled by the second embodiment, it is worth noting that all of these examples can also be handled by the first embodiment simply by passing this information in the PrivateExt data field, and letting the Service Guide filter function make a decision based on the attributes of the content item.

To implement the various embodiments, some changes to the BCAST specification may be implemented. For one, the Service fragment may be modified to add a clientApplication attribute. Adding the clientApplication attribute to the Service fragment may designate the external enabler client application of the BCAST terminal, such as a MobAd Client, that will determine whether and how content filtering will be accomplished. For example, values for clientApplication may be designated as "0" for BCAST and "1" for MobAd, with 2 to 127 reserved for future use, and 128 to 255 reserved for proprietary use. When the value for clientApplication is "0" (i.e., BCAST), normal filtering of content items belonging to the service identified in the service fragment may be performed by the receiver device, for example, in accordance with metadata contained in the Service fragment. Examples of such metadata are target user profile and broadcast area metadata as described above. When the value of clientApplication is "1" (i.e., indicating that the service fragment is for a MobAd Client), whether or not such content filtering is to be performed by the receiver device may be dictated by the external MobAd application. Similarly, for other values of clientApplication, the corresponding external client application will determine whether or not content filtering is to be performed by the receiver device.

Another change that may be made to the BCAST specification may be the addition of "MobAd ad service" to the ServiceType element within the Service fragment specification. For example, this new service type may be assigned a unique ServiceType value to be distinguished from currently defined ServiceType values. For the new service type, normal filtering of content items belonging to the service identified by the Service fragment by metadata contained in the Service Guide may not be automatically performed. Instead, it is expected that the external client application (e.g., a MobAd Client) of the BCAST Client will instruct the BCAST Client whether and how such content filtering is to be performed. The BCAST 1.1 standard is capable of supporting and interworking with other enablers that wish to make use of the broadcast content delivery and related features provided by BCAST. MobAd is but one example of such external enablers. In particular, MobAd has defined a "MobAd over BCAST Adaptation" specification which can utilize BCAST capabilities in different ways to support targeted advertising delivery. To properly support this adaptation, each broadcast service may be identified by its type via the ServiceType element in the service fragment. For example, if the service type corresponds to a broadcast service category, nominal content filtering by the BCAST Client in accordance with the Service Guide metadata occurs, and the associated broadcast service application (e.g. linear TV viewer) is presumed to be the recipient of the selectively downloaded contents. However, if the service type corresponds to "MobAd subscribed ad service," although content filtering by the BCAST Client is performed in relation to the Service Guide metadata, the recipient of the selectively downloaded contents is now the MobAd Ad Engine". Examples of possible Service Guide metadata for ad filtering purposes are the target user profile and location-based content attributes described above.

Figure 12A:
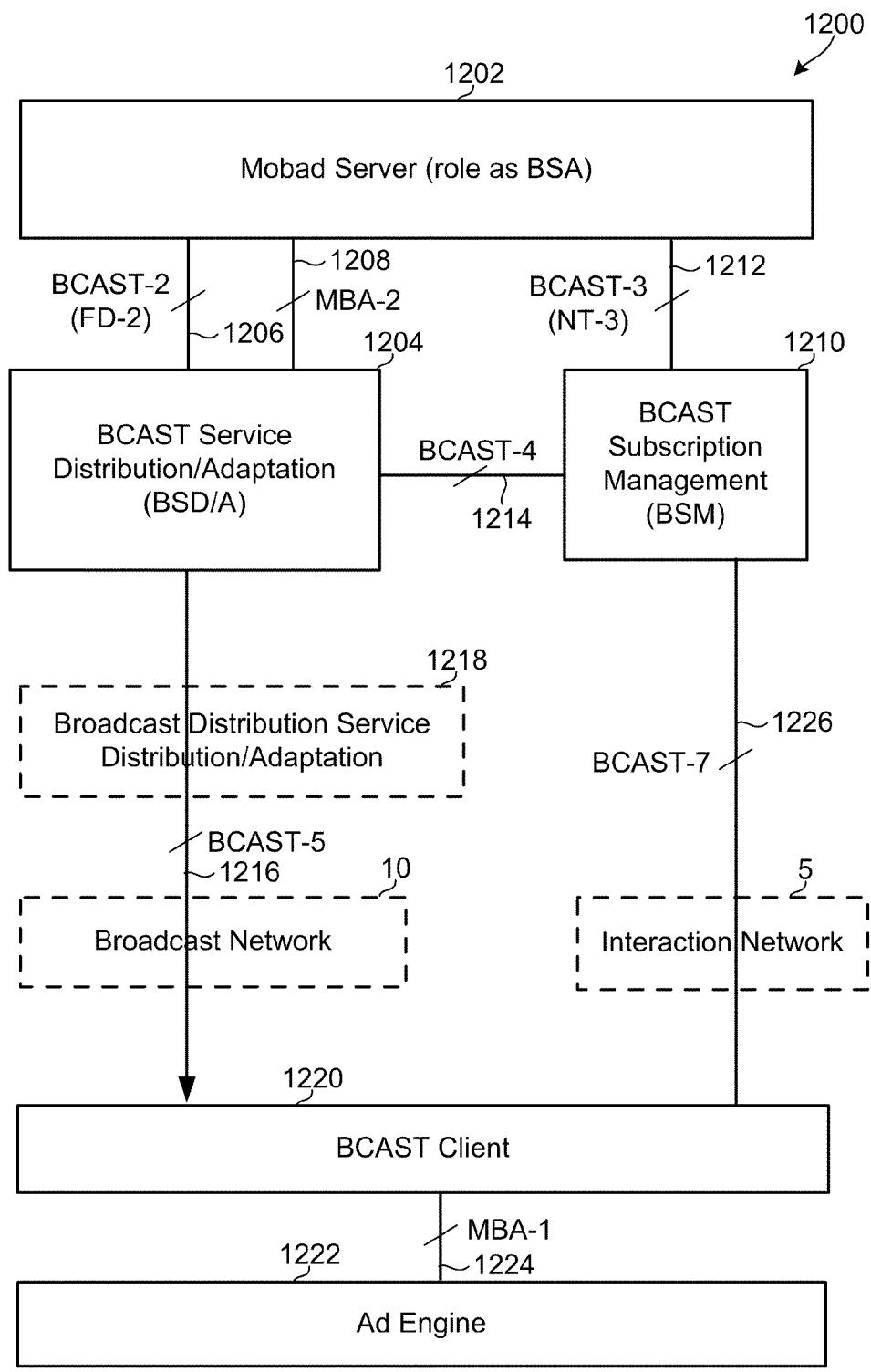
FIG. 12A is communication architecture diagram for communicating mobile advertising to mobile devices according to an embodiment.

FIG. 12A illustrates communication interfaces that may be used to implement the various embodiments in a BCAST implementation 1200. On the broadcaster side, an ad server 1202 which acts as an ad content source may be configured as a BCAST Service Application (BSA). The Ad Server 1202 may provision advertisements, assemble or generate ad content metadata, control the delivery schedule for the broadcast of advertisements, and provide notification event notices to the broadcast network entities. The provisioning of ads and ad metadata may be provided to the BCAST Service Distribution/Adaptation server 1204 via the FD-2 interface of BCAST-2 1206, as well as over the MobAd-BCAST Adaptation-2 (MBA-2) communication link 1208 as defined in the MobAd over BCAST Adaptation specification. The provisioning of ad delivery schedules may be accomplished via out of band communication links not specified by the MobAd standard.

Delivery of download auxiliary data trigger notification events to the BCAST Subscription Management (BSM) server 1210 may be accomplished over the BCAST-3 communication link 1212. Interactions between the BCAST Service Distribution/Adaptation server 1204 and the BCAST Subscription Management server 1210 may be accomplished via the BCAST-4 communication link 1214. For example, notification event generation may be communicated from the BCAST Subscription Management server 1210 to the BCAST Service Distribution/Adaptation server 12 or 4D at the BCAST-4 communication link 1214.

During broadcast, auxiliary data, file download ad services carrying advertisements, and ad content metadata messages may be broadcast via the BCAST-5 broadcast link 1216 via the broadcast distribution service distribution/adaptation 1218 and the broadcast network 10. Similarly, auxiliary data trigger notification messages may be transmitted via the same broadcast path. Broadcast advertising content and advertising metadata messages received by the mobile device's BCAST Client 1220 may be provided to the Ad Engine 1222 via the non-specified MBA-1 interface supporting service discovery, registration and deregistration between the BCAST Client 1220 and the Ad Engine 1222. The same interface may receive advertising content reception requests notifications from the Ad Engine 1222 to the BCAST Client 1220, by which the Ad Engine 1222 informs the BCAST Client 1220 of particular ad content that should be received. FIG. 12A also shows the reverse link by which the BCAST Client 1220 can communicate with the BCAST Subscription Management server 1210 through the interaction network 5 via the BCAST-7 communication link 1226.

Figure 12B:
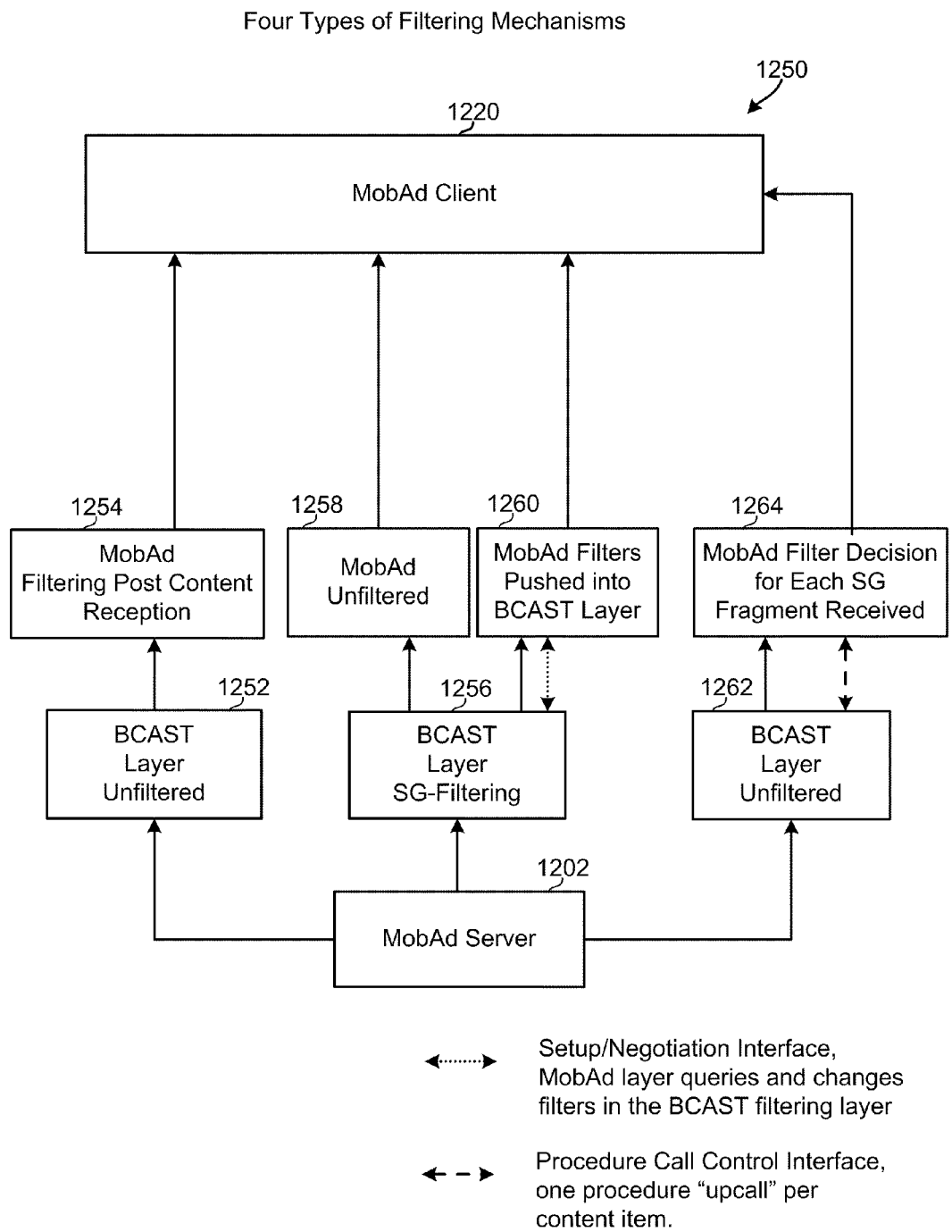
FIG. 12B is a communication flow diagram illustrating four alternative types of advertising filtering that may be addressed in various embodiments.

FIG. 12B illustrates communication flows associated with four different types of advertising filtering mechanisms that may be implemented using different embodiments as described above. In a first filtering mechanism, the MobAd Server 1202 provides ad content for broadcast which is received by the BCAST layer without filtering, block 1252, and passed on to the MobAd Client 1220 for filtering by the MobAd application post content reception, block 1254. In a second filtering mechanism, ad content broadcast from the MobAd server 1202 is filtered by the BCAST client based on information provided in the service guide (SG filtering) in block 1256, with the added content passing the SG filter provided to the MobAd Client 1220 without further filtering in block 1258. In a third filtering mechanism, advertising content broadcast from the MobAd server 1202 is filtered by the BCAST client in block 1256 based on information provided in the service guide (SG filtering) and based on additional content filters pushed down to the BCAST layer by the MobAd client 1220. This filtering content involves a step of setting up and negotiating the MobAd filters to be implemented in the BCAST filtering layer by the MobAd client 1220. In a fourth filtering mechanism, advertising content broadcast from the MobAd server 1202 is passed on by the BCAST client in block 1262 in response to an "upcall" from the MobAd Client 1220 which makes a filtering decision for each Service Guide fragment received in block 1264. This filtering content involves the step of conducting a content upcall for each content item selected by the MobAd Client 1220 based on information in each service guide fragment received.

Figure 13:
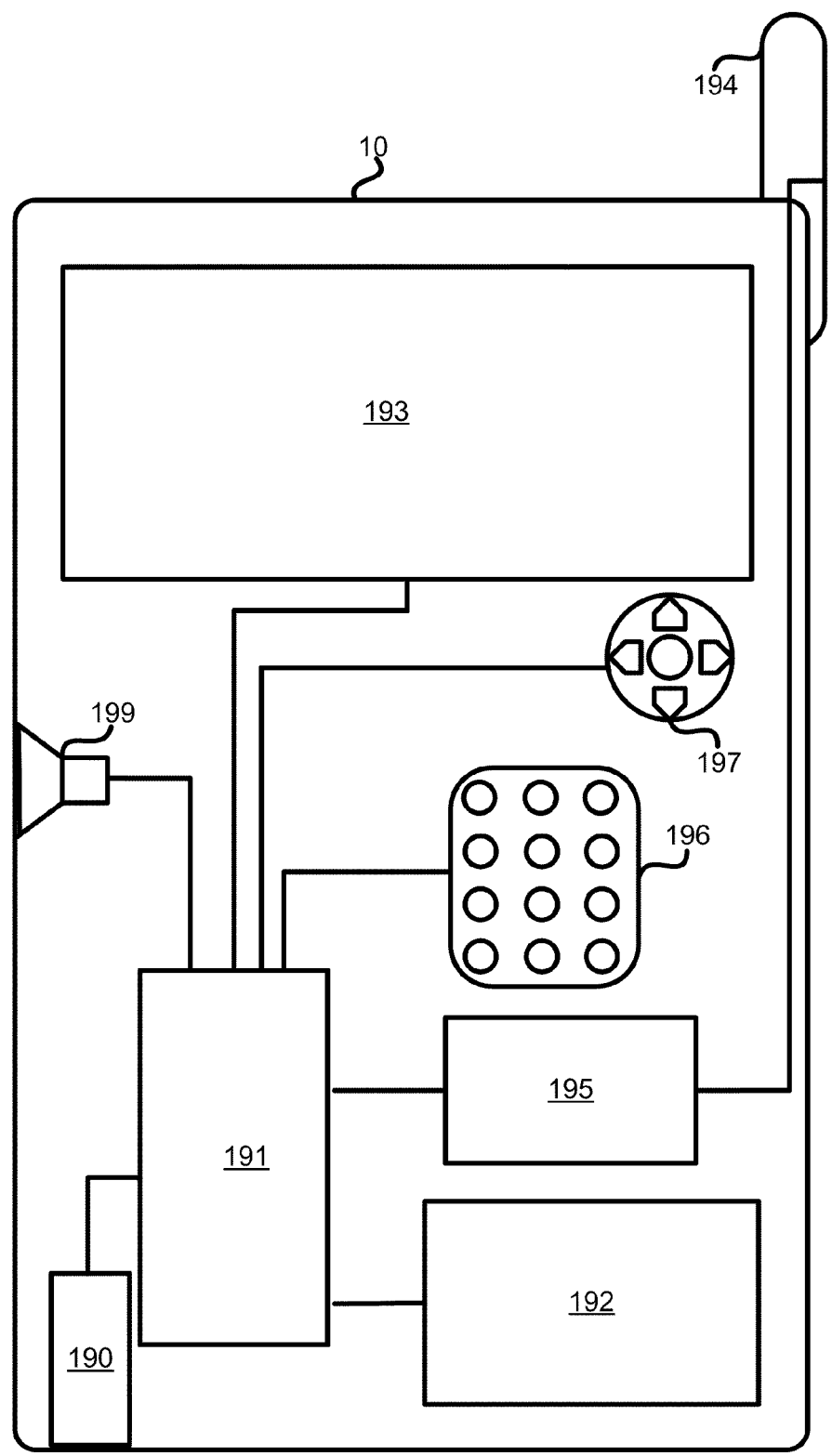
FIG. 13 is a component block diagram of a mobile device suitable for use in an embodiment.

Typical mobile devices 10 suitable for use with the various embodiments will have in common the components illustrated in FIG. 13. For example, an exemplary mobile device 10 may include a processor 191 coupled to internal memory 192, a display 193, and to a speaker 199. Additionally, the mobile device 10 may have an antenna 194 for sending and receiving electromagnetic radiation that is connected to a wireless data link and/or cellular telephone transceiver 195 coupled to the processor 191. In some implementations, the transceiver 195 and portions of the processor 191 and memory 192 used for cellular telephone communications are collectively referred to as the air interface since it provides a data interface via a wireless data link. Mobile devices typically also include a key pad 196 or miniature keyboard and menu selection buttons or rocker switches 197 for receiving user inputs.

Figure 14:
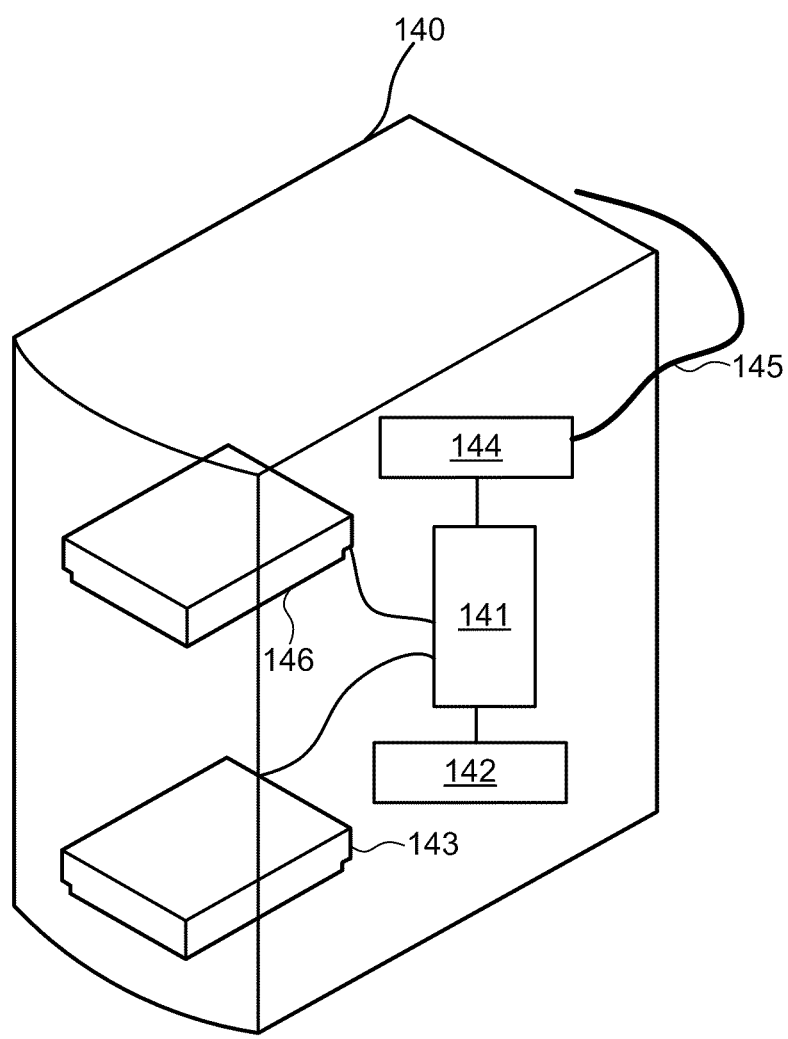
FIG. 14 is a component block diagram of a server device suitable for use in an embodiment.

A number of the embodiments described above may also be implemented with any of a variety of general purpose computers or remote server devices, such as the server 140 illustrated in FIG. 14. Such a server 140 typically includes a processor 141 coupled to volatile memory 142 and a large capacity nonvolatile memory, such as a disk drive 143. The server 140 may also include a floppy disc drive and/or a compact disc (CD) drive 146 coupled to the processor 141. The server 140 may also include network access ports 144 coupled to the processor 141 for communicating with network 145, such as the Internet.

The processors 191, 141 may be any programmable microprocessor, microcomputer or multiple processor chip or chips that can be configured by software instructions (applications) to perform a variety of functions, including the functions of the various embodiments described herein. In some mobile devices, multiple processors 191, 141 may be provided, such as one processor dedicated to wireless communication functions and one processor dedicated to running other applications. Typically, software applications may be stored in the internal memory 192, 142 before they are accessed and loaded into the processor 191, 141. In some mobile devices and servers, the processor 191, 141 may include internal memory sufficient to store the application software instructions. The mobile device 10 may also include a separate memory chip 190 such as smart card for storing information related to credits, token and coupons such as in an electronic purse according to the various embodiments. In some mobile devices, the secure memory may be in a separate memory chip coupled to the processor 191. In many mobile devices 10 and servers 140, the internal memory 192, 142 may be a volatile or nonvolatile memory, such as flash memory, or a mixture of both. For the purposes of this description, a general reference to memory refers to all memory accessible by the processor 191, 141, including internal memory 192, 142, a memory chip 190, removable memory plugged into the mobile device or server, and memory within the processor 191, 141 itself.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module executed which may reside on a tangible non-transitive computer-readable storage medium. Non-transitive computer-readable storage media may be any available storage media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable storage media. Additionally, the operations of a method or algorithm may reside as one or any combination or set of codes and/or instructions on a machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for selectively receiving in a receiver device application content that is transmitted by a broadcast network, comprising:
   receiving, in a wireless broadcast, an application metadata message in a broadcast client operating in the receiver device, the application metadata message including metadata regarding content scheduled to be broadcast to an application operating in the receiver device;
   passing the metadata from the broadcast client to the application operating in the receiver device;
   receiving content selection criteria or a direct filtering decision in the broadcast client from the application; and
   selectively passing content received in broadcast transmissions to the application based upon the content selection criteria or based on the direct filtering decision.

2. The method of claim 1, wherein selectively passing content received in broadcast transmissions to the application based upon the content selection criteria comprises:
   receiving a plurality of application content broadcasts;
   caching the plurality of received application content broadcasts as a plurality of application content data sets in memory;
   selecting one or more of the plurality of application content data sets based upon the content selection criteria; and
   passing the selected one or more of the plurality of application content data sets to the application.

3. The method of claim 1, wherein selectively passing content received in broadcast transmissions to the application is based upon filtering data provided by the application to the broadcast client which overrides other filtering data used by the broadcast client.

4. The method of claim 1, wherein selectively passing content received in broadcast transmissions to the application is based upon new selection metadata previously unknown to the broadcast client which causes the broadcast client to behave in a new manner.

5. The method of claim 1, wherein the broadcast client is an Open Mobile Alliance Broadcasting (BCAST) terminal.

6. The method of claim 5, wherein the application is an Open Mobile Alliance (OMA) enabler application.

7. The method of claim 6, wherein the OMA enabler application is an OMA Mobile Advertising (MobAd) application.

8. The method of claim 7, wherein the OMA enabler application is an OMA Device Management (DM) application.

9. The method of claim 7, wherein the received application metadata message is received in an auxiliary data trigger notification message.

10. The method of claim 7, further comprising receiving additional application metadata as part of a Service Guide transmission,
    wherein application metadata message is received from both the Service Guide transmission and the auxiliary data trigger notification message.

11. The method of claim 10, wherein the received application metadata message is received as part of the Service Guide transmission.

12. The method of claim 11, wherein selectively passing content received in broadcast transmissions from the broadcast client to the application based upon the content selection criteria comprises selecting application content broadcasts for reception by applying the selection criteria to application content attributes included in a private extension element within a service fragment in the Service Guide transmission.

13. The method of claim 12, wherein application metadata messages within the Service Guide transmission are further identified by a client application attribute value included in a service fragment in the Service Guide transmission.

14. The method of claim 1, wherein selectively passing content received in broadcast transmissions to the application based upon the content selection criteria comprises:
    selecting an application content broadcast for reception based upon the content selection criteria;
    energizing receiver circuitry to receive the selected application content;
    receiving the selected application content; and
    passing the selected application content to the application.

15. The method of claim 14, wherein:
    the content selection criteria is received in an auxiliary data trigger notification message; and
    selecting an application content broadcast for reception based upon the content selection criteria comprises selecting the application content broadcast using a content identifier.

16. The method of claim 14, wherein:
    the content selection criteria comprises a filter criterion to be applied to attributes of application content; and
    selecting an application content broadcast for reception based upon the content selection criteria comprises applying the filter criterion to application content attributes included in the metadata to select an application content broadcast whose attributes satisfy the filter criterion.

17. The method of claim 16, wherein the filter criterion is received in a Service Guide.

18. The method of claim 16, wherein the filter criterion is received from the application.

19. The method of claim 1, wherein:
    the content selection criteria comprises a first criterion and a second criterion; and
    selectively passing content received in broadcast transmissions to the application based upon the content selection criteria comprises:
       selecting a plurality of application content broadcasts for reception based upon the first criterion;

energizing receiver circuitry to receive the selected plurality of application content broadcasts;

caching the plurality of received application content broadcasts as a plurality of application content data sets in memory;

selecting one or more of the plurality of application content data sets based upon the second criterion; and passing the selected one or more of the plurality of application content data sets to the application.

20. The method of claim 19, wherein the first criterion and the second criterion are received from one or more of a Service Guide, an auxiliary data trigger notification message, and the application.

21. The method of claim 1, wherein selectively passing content received in the broadcast transmissions to the application based upon the content selection criteria or the direct filtering decision comprises:

receiving a "yes/no" decision from the application on whether to cache and pass the content to the application when received by the receiver device, wherein the receiver device sleeps through the wireless broadcast to decrease power consumption when the received decision is "no."

22. A broadcast receiver device, comprising:

a processor;

a broadcast receiver circuit coupled to the processor and configured to receive transmissions from a broadcast network; and memory coupled to the processor, wherein the processor is configured with processor-executable instructions to host a broadcast client and an application operating within the processor and to perform operations comprising:

receiving wireless broadcast transmissions;

receiving in a wireless broadcast via the broadcast client, an application metadata message from within the received broadcast transmissions, the application metadata message including metadata regarding content which will be broadcast at a future time relevant to a an application;

passing the metadata from the broadcast client to the application;

receiving content selection criteria or a direct filtering decision in the broadcast client from the application; and selectively passing content received in broadcast transmissions to the application based upon the content selection criteria or based on the direct filtering decision.

23. The broadcast receiver device of claim 22, wherein the processor is configured with processor-executable instructions such that selectively passing content received in broadcast transmissions to the application based upon the content selection criteria comprises:

receiving a plurality of application content broadcasts;

caching the plurality of received application content broadcasts as a plurality of application content data sets in memory;

selecting one or more of the plurality of application content data sets based upon the selection criteria; and passing the selected one or more of the plurality of application content data sets to the application.

24. The broadcast receiver device of claim 22, wherein the processor is configured with processor-executable instructions such that selectively passing content received in broadcast transmissions to the application is based upon filtering data provided by the application to the broadcast client which overrides other filtering data used by the broadcast client.

25. The broadcast receiver device of claim 22, wherein the processor is configured with processor-executable instructions such that selectively passing content received in broadcast transmissions to the application is based upon new selection metadata previously unknown to the broadcast client which causes the broadcast client to behave in a new manner.

26. The broadcast receiver device of claim 22, wherein the processor is configured with processor-executable instructions such that the broadcast client is an Open Mobile Alliance Broadcasting (BCAST) terminal.

27. The broadcast receiver device of claim 26, wherein the processor is configured with processor-executable instructions such that the application is an Open Mobile Alliance (OMA) enabler application.

28. The broadcast receiver device of claim 27, wherein the processor is configured with processor-executable instructions such that the OMA enabler application is an OMA Mobile Advertising (MobAd) application.

29. The broadcast receiver device of claim 28, wherein the processor is configured with processor-executable instructions such that the OMA enabler application is an OMA Device Management (DM) application.

30. The broadcast receiver device of claim 28, wherein the processor is configured with processor-executable instructions such that the received application metadata message is received in an auxiliary data trigger notification message.

31. The broadcast receiver device of claim 28, wherein the processor is configured with processor-executable instructions to perform operations further comprising receiving additional application metadata as part of a Service Guide transmission, wherein the processor is configured with processor-executable instructions such that application metadata is received from both the Service Guide transmission and the auxiliary data trigger notification message.

32. The broadcast receiver device of claim 31, wherein the processor is configured with processor-executable instructions such that the received application metadata message is received as part of the Service Guide transmission.

33. The broadcast receiver device of claim 32, wherein the processor is configured with processor-executable instructions such that selectively passing content received in broadcast transmissions from the broadcast client to the application based upon the content selection criteria comprises selecting application content broadcasts for reception by applying the selection criteria to application content attributes included in a private extension element within a service fragment in the Service Guide transmission.

34. The broadcast receiver device of claim 33, wherein the processor is configured with processor-executable instructions such that application metadata messages within the Service Guide transmission are further identified by a client application attribute value included in a service fragment in the Service Guide transmission.

35. The broadcast receiver device of claim 22, wherein the processor is configured with processor-executable instructions such that selectively passing content received in broadcast transmissions to the application based upon the content selection criteria comprises:

selecting an application content broadcast for reception based upon the content selection criteria;

energizing receiver circuitry to receive the selected application content; receiving the selected application content; and passing the selected application content to the application.

36. The broadcast receiver device of claim 35, wherein the processor is configured with processor-executable instructions such that:

the content selection criteria is received in an auxiliary data trigger notification message; and selecting an application content broadcast for reception based upon the content selection criteria comprises selecting the application content broadcast using a content identifier.

37. The broadcast receiver device of claim 35, wherein the processor is configured with processor-executable instructions such that:

the content selection criteria comprises a filter criterion to be applied to attributes of application content; and selecting an application content broadcast for reception based upon the content selection criteria comprises applying the filter criterion to application content attributes included in the metadata to select an application content broadcast whose attributes satisfy the filter criterion.

38. The broadcast receiver device of claim 37, wherein the processor is configured with processor-executable instructions such that the filter criterion is received in a Service Guide.

39. The broadcast receiver device of claim 37, wherein the processor is configured with processor-executable instructions such that the filter criterion is received from the application.

40. The broadcast receiver device of claim 22, wherein the processor is configured with processor-executable instructions such that:

the content selection criteria comprises a first criterion and a second criterion; and selectively passing content received in broadcast transmissions to the application based upon the content selection criteria comprises:

selecting a plurality of application content broadcasts for reception based upon the first criterion;

energizing receiver circuitry to receive the selected plurality of application content broadcasts;

caching the plurality of received application content broadcasts as a plurality of application content data sets in memory;

selecting one or more of the plurality of application content data sets based upon the second selection criterion; and passing the selected one or more of the plurality of application content data sets to the application.

41. The broadcast receiver device of claim 39, wherein the processor is configured with processor-executable instructions such that the first criterion and the second criterion are received from one or more of a Service Guide, an auxiliary data trigger notification message, and the application.

42. The broadcast receiver device of claim 22, wherein selectively passing content received in the broadcast transmissions to the application based upon the content selection criteria or the direct filtering decision comprises:

receiving a "yes/no" decision from the application on whether to cache and pass the content to the application when received by the receiver device, wherein the receiver device sleeps through the wireless broadcast to decrease power consumption when the received decision is "no."

43. A broadcast receiver device, comprising:

means for operating a broadcast client;

means for operating an application;

means for receiving broadcast transmissions;

means for receiving, in a wireless broadcast via the broadcast client an application metadata message within the received broadcast transmissions, the application metadata message including metadata regarding content which will be broadcast at a future time relevant to an application;

means for passing the metadata from the broadcast client to the application;

means for receiving content selection criteria or a direct filtering decision in the broadcast client from the application; and means for selectively passing content received in broadcast transmissions to the application based upon the content selection criteria or based on the direct filtering decision.

44. The broadcast receiver device of claim 43, wherein means for selectively passing content received in broadcast transmissions to the application based upon the content selection criteria comprises:

means for receiving a plurality of application content broadcasts;

means for caching the plurality of received application content broadcasts as a plurality of application content data sets in memory;

means for selecting one or more of the plurality of application content data sets based upon the selection criteria; and means for passing the selected one or more of the plurality of application content data sets to the application.

45. The broadcast receiver device of claim 43, wherein means for selectively passing content received in broadcast transmissions to the application comprises means for selectively passing content received in broadcast transmissions to the application based upon filtering data provided by the application to the broadcast client which overrides other filtering data used by the broadcast client.

46. The broadcast receiver device of claim 43, wherein means for selectively passing content received in broadcast transmissions to the application comprises means for selectively passing content received in broadcast transmissions to the application based upon new selection metadata previously unknown to the broadcast client which causes the broadcast client to behave in a new manner.

47. The broadcast receiver device of claim 43, wherein the broadcast client is an Open Mobile Alliance Broadcasting (BCAST) terminal.

48. The broadcast receiver device of claim 47, wherein the application is an Open Mobile Alliance (OMA) enabler application.

49. The broadcast receiver device of claim 48, wherein the OMA enabler application is an OMA Mobile Advertising (MobAd) application.

50. The broadcast receiver device of claim 49, wherein the OMA enabler application is an OMA Device Management (DM) application.

51. The broadcast receiver device of claim 49, wherein means for receiving the application metadata message comprises means for receiving the application metadata message in an auxiliary data trigger notification message.

52. The broadcast receiver device of claim 49, further comprising means for receiving additional application metadata as part of a Service Guide transmission.

53. The broadcast receiver device of claim 52, wherein means for receiving the application metadata message comprises means for receiving the application metadata message as part of the Service Guide transmission.

54. The broadcast receiver device of claim 53, wherein means for selectively passing content received in broadcast transmissions from the broadcast client to the application based upon the content selection criteria comprises means for selecting application content broadcasts for reception by applying the selection criteria to application content attributes included in a private extension element within a service fragment in the Service Guide transmission.

55. The broadcast receiver device of claim 54, wherein application metadata messages within the Service Guide transmission are further identified by a client application attribute value included in a service fragment in the Service Guide transmission.

56. The broadcast receiver device of claim 43, wherein means for selectively passing content received in broadcast transmissions to the higher layer application based upon the content selection criteria comprises:
  means for selecting an application content broadcast for reception based upon the content selection criteria;
  means for energizing receiver circuitry to receive the selected application content;
  means for receiving the selected application content; and
  means for passing the selected application content to the application.

57. The broadcast receiver device of claim 56, wherein:
  means for receiving the content selection criteria in an auxiliary data trigger notification message; and
  means for selecting an application content broadcast for reception based upon the content selection criteria comprises means for selecting the application content broadcast using a content identifier.

58. The broadcast receiver device of claim 56, wherein:
  the content selection criteria comprises a filter criterion to be applied to attributes of application content; and
  means for selecting an application content broadcast for reception based upon the content selection criteria comprises means for applying the filter criterion to application content attributes included in the metadata to select an application content broadcast whose attributes satisfy the filter criterion.

59. The broadcast receiver device of claim 58, further comprising means for receiving the filter criterion in a Service Guide.

60. The broadcast receiver device of claim 58, further comprising means for receiving the filter criterion from the application.

61. The broadcast receiver device of claim 43, wherein:
  the content selection criteria comprises a first criterion and a second criterion; and
  means for selectively passing content received in broadcast transmissions to the application based upon the content selection criteria comprises:
    means for selecting a plurality of application content broadcasts for reception based upon the first criterion;
    means for energizing receiver circuitry to receive the selected plurality of application content broadcasts;
    means for caching the plurality of received application content broadcasts as a plurality of application content data sets in memory;
    means for selecting one or more of the plurality of application content data sets based upon the second criterion; and
    means for passing the selected one or more of the plurality of application content data sets to the application.

62. The broadcast receiver device of claim 61, further comprising means for receiving the first criterion and the second criterion from one or more of a Service Guide, an auxiliary data trigger notification message, and the application.

63. The broadcast receiver device of claim 43, wherein selectively passing content received in the broadcast transmissions to the application based upon the content selection criteria or the direct filtering decision comprises:
  receiving a "yes/no" decision from the application on whether to cache and pass the content to the application when received by the receiver device,
  wherein the receiver device sleeps through the wireless broadcast to decrease power consumption when the received decision is "no."

64. A non-transitory processor-readable storage medium having stored thereon processor-executable instructions configured to cause a processor within a broadcast receiver device to perform operations comprising:
  receiving, in a wireless broadcast, an application metadata message in a broadcast client operating in the receiver device, the application metadata message including metadata regarding content which will be broadcast at a future time relevant to an application;
  passing the metadata from the broadcast client to the application operating in the receiver device;
  receiving content selection criteria or a direct filtering decision in the broadcast client from the application; and
  selectively passing content received in broadcast transmissions to the application based upon the content selection criteria or based on the direct filtering decision.

65. The non-transitory processor-readable storage medium of claim 64, wherein selectively passing content received in broadcast transmissions to the application based upon the content selection criteria comprises:
  receiving a plurality of application content broadcasts;
  caching the plurality of received application content broadcasts as a plurality of application content data sets in memory;
  selecting one or more of the plurality of application content data sets based upon the selection criteria; and
  passing the selected one or more of the plurality of application content data sets to the application.

66. The non-transitory processor-readable storage medium of claim 64, wherein selectively passing content received in broadcast transmissions to the application is based upon filtering data provided by the application to the broadcast client which overrides other filtering data used by the broadcast client.

67. The non-transitory processor-readable storage medium of claim 64, wherein selectively passing content received in broadcast transmissions to the application is based upon new selection metadata previously unknown to the broadcast client which causes the broadcast client to behave in a new manner.

68. The non-transitory processor-readable storage medium of claim 64, wherein the broadcast client is an Open Mobile Alliance Broadcasting (BCAST) terminal.

69. The non-transitory processor-readable storage medium of claim 65, wherein the application is an Open Mobile Alliance (OMA) enabler application.

70. The non-transitory processor-readable storage medium of claim 69, wherein the OMA enabler application is an OMA Mobile Advertising (MobAd) application.

71. The non-transitory processor-readable storage medium of claim 70, wherein the OMA enabler application is an OMA Device Management (DM) application.

72. The non-transitory processor-readable storage medium of claim 70, wherein the received application metadata message is received in an auxiliary data trigger notification message.

73. The non-transitory processor-readable storage medium of claim 70, further comprising receiving additional application metadata as part of a Service Guide transmission,
wherein application metadata is received from both the Service Guide transmission and the auxiliary data trigger notification message.

74. The non-transitory processor-readable storage medium of claim 73, wherein the received application metadata message is received as part of the Service Guide transmission.

75. The non-transitory processor-readable storage medium of claim 74, wherein selectively passing content received in broadcast transmissions from the broadcast client to the application based upon the content selection criteria comprises selecting application content broadcasts for reception by applying the selection criteria to application content attributes included in a private extension element within a service fragment in the Service Guide transmission.

76. The non-transitory processor-readable storage medium of claim 75, wherein application metadata messages within the Service Guide transmission are further identified by a client application attribute value included in a service fragment in the Service Guide transmission.

77. The non-transitory processor-readable storage medium of claim 64, wherein selectively passing content received in broadcast transmissions to the application based upon the content selection criteria comprises:
selecting an application content broadcast for reception based upon the content selection criteria;
energizing receiver circuitry to receive the selected application content;
receiving the selected application content; and
passing the selected application content to the application.

78. The non-transitory processor-readable storage medium of claim 77, wherein:
the content selection criteria is received in an auxiliary data trigger notification message; and
selecting an application content broadcast for reception based upon the content selection criteria comprises selecting the application content broadcast using a content identifier.

79. The non-transitory processor-readable storage medium of claim 77, wherein:
the content selection criteria comprises a filter criterion to be applied to attributes of application content; and
selecting an application content broadcast for reception based upon the content selection criteria comprises applying the filter criterion to application content attributes included in the metadata to select an application content broadcast whose attributes satisfy the filter criterion.

80. The non-transitory processor-readable storage medium of claim 79, wherein the filter criterion is received in a Service Guide.

81. The non-transitory processor-readable storage medium of claim 79, wherein the filter criterion is received from the application.

82. The non-transitory processor-readable storage medium of claim 64, wherein:
the content selection criteria comprises a first criterion and a second criterion; and
selectively passing content received in broadcast transmissions to the application based upon the content selection criteria comprises:
selecting a plurality of application content broadcasts for reception based upon the first criterion;
energizing receiver circuitry to receive the selected plurality of application content broadcasts;
caching the plurality of received application content broadcasts as a plurality of application content data sets in memory;
selecting one or more of the plurality of application content data sets based upon the second selection criterion; and
passing the selected one or more of the plurality of application content data sets to the application.

83. The non-transitory processor-readable storage medium of claim 82, wherein the first criterion and the second criterion are received from one or more of a Service Guide, an auxiliary data trigger notification message, and the application.

84. The non-transitory processor-readable storage medium of claim 64, wherein selectively passing content received in the broadcast transmissions to the application based upon the content selection criteria or the direct filtering decision comprises:
receiving a "yes/no" decision from the application on whether to cache and pass the content to the application when received by the receiver device,
wherein the receiver device sleeps through the wireless broadcast to decrease power consumption when the received decision is "no."

85. A method for delivering application content to receiver devices via a broadcast service, comprising:
broadcasting, as part of a Service Guide transmission metadata regarding application content that is scheduled to be broadcast in a second transmission; and
broadcasting the application content in the second transmission,
wherein the application content metadata comprises:
attributes of the application content provided in a private extension element within a service fragment of the Service Guide transmission; and
a service type attribute value included in the service fragment that indicates that the service fragment contains application content metadata.

86. A broadcast network, comprising:
broadcasting, as part of a Service Guide transmission metadata regarding application content that is scheduled to be broadcast in a second transmission; and
broadcasting the application content in the second transmission,
wherein the application content metadata comprises:
attributes of the application content provided in a private extension element within a service fragment of the Service Guide transmission; and
a service type attribute value included in the service fragment that indicates that the service fragment contains application content metadata.

87. A broadcast network, comprising:
means for broadcasting, as part of a Service Guide transmission metadata regarding application content that is scheduled to be broadcast in a second transmission; and
means for broadcasting the application content in the second transmission,
wherein the application content metadata comprises:
attributes of the application content provided in a private extension element within a service fragment of the Service Guide transmission; and a service type attribute value included in the service fragment that indicates that the service fragment contains application content metadata.

88. A non-transitory server-readable storage medium having stored thereon server-executable instructions configured to cause a server coupled to a broadcast transmitter within a broadcast network to perform operations comprising:
broadcasting, as part of a Service Guide transmission metadata regarding application content that is scheduled to be broadcast in a second transmission; and
broadcasting the application content in the second transmission,
wherein the application content metadata comprises:
attributes of the application content provided in a private extension element within a service fragment of the Service Guide transmission; and
a service type attribute value included in the service fragment that indicates that the service fragment contains application content metadata.

89. A broadcast communication system, comprising:
a broadcast system comprising a server coupled to a broadcast transmitter; and
a plurality of broadcast receiver devices,
wherein the broadcast system server is configured with computer-executable instructions to perform operations comprising:
broadcasting, as part of a Service Guide transmission metadata regarding application content that is scheduled to be broadcast in a second transmission; and
broadcasting the application content in the second transmission,
wherein the application content metadata comprises:
attributes of the application content provided in a private extension element within a service fragment of the Service Guide transmission; and
a service type attribute value included in the service fragment that indicates that the service fragment contains application content metadata, and
wherein each of the plurality of broadcast receiver devices comprise:
a processor;
a broadcast receiver circuit coupled to the processor and configured to receive transmissions from a broadcast network; and
memory coupled to the processor,
wherein the processor is configured with processor-executable instructions to host a broadcast client and an application operating within the processor and to perform operations comprising:
receiving broadcast transmissions;
receiving in the broadcast client an application metadata message from within the received broadcast transmissions, the application metadata message including metadata regarding content which will be broadcast at a future time relevant to an application;
passing the metadata from the broadcast client to the application;
receiving content selection criteria or a direct filtering decision in the broadcast client from the application; and
selectively passing content received in broadcast transmissions to the application based upon the content selection criteria or based on the direct filtering decision.

90. The broadcast communication system of claim 89, wherein selectively passing content received in the broadcast transmissions to the application based upon the content selection criteria or the direct filtering decision comprises:
receiving a "yes/no" decision from the application on whether to cache and pass the content to the application when received by the receiver device, wherein the receiver device sleeps through the wireless broadcast to decrease power consumption when the received decision is "no."

* * * * *